United States Patent [19]

Nishibori

[11] Patent Number: 5,725,939
[45] Date of Patent: Mar. 10, 1998

[54] SYNTHETIC WOOD MEAL, METHOD AND APPARATUS FOR MANUFACTURING THE SAME; SYNTHETIC WOOD BOARD INCLUDING THE SYNTHETIC WOOD MEAL, METHOD AND APPARATUS OF EXTRUSION MOLDING THEREFOR

[75] Inventor: Sadao Nishibori, Tokyo, Japan

[73] Assignee: EIN Engineering Co., Ltd., Tokyo, Japan

[21] Appl. No.: 706,685

[22] Filed: Sep. 6, 1996

Related U.S. Application Data

[63] Continuation of Ser. No. 346,625, Nov. 30, 1994, abandoned.

[30] Foreign Application Priority Data

Feb. 10, 1994 [JP] Japan .................... 6-016794

[51] Int. Cl.⁶ .................... B29B 9/12; B29C 47/36
[52] U.S. Cl. .................... 428/292.4; 264/68; 264/118; 264/126; 264/211.11; 425/209; 425/325; 425/461; 428/326; 524/13
[58] Field of Search .................... 428/292.4, 106, 428/99, 326; 264/211.11, 109, 68, 119, 118, 120, 126, 45.3, 323; 425/461, 209, 325, 379.1; 524/13

[56] References Cited

U.S. PATENT DOCUMENTS

| | | | |
|---|---|---|---|
| 3,936,518 | 2/1976 | Soda et al. | 264/45.5 |
| 4,324,748 | 4/1982 | Hatakeyama et al. | 425/461 |
| 4,358,418 | 11/1982 | Heggenstaller | 425/379.1 |
| 4,361,530 | 11/1982 | Peer | 264/120 |
| 4,505,869 | 3/1985 | Nishibori | 264/118 |
| 4,610,900 | 9/1986 | Nishibori | 156/62.2 |
| 4,624,976 | 11/1986 | Amano et al. | 524/13 |
| 5,055,247 | 10/1991 | Uedo et al. | 524/13 |
| 5,082,605 | 1/1992 | Brooks et al. | 264/118 |
| 5,088,910 | 2/1992 | Goforth et al. | 264/118 |
| 5,217,655 | 6/1993 | Schmidt | 264/37 |
| 5,323,971 | 6/1994 | Nishibori | 241/3 |
| 5,332,602 | 7/1994 | Barré et al. | 428/99 |
| 5,413,746 | 5/1995 | Birjukov | 264/118 |
| 5,417,904 | 5/1995 | Razi et al. | 264/119 |

FOREIGN PATENT DOCUMENTS

| | | | |
|---|---|---|---|
| 0139986 | 5/1985 | European Pat. Off. . | |
| 0172436 | 2/1986 | European Pat. Off. . | |
| 426619 | 5/1991 | European Pat. Off. . | |
| 1175421 | 6/1959 | Germany | 264/568 |
| 61-16965 | 1/1986 | Japan . | |
| 359804 | 9/1991 | Japan . | |
| 47283 | 2/1992 | Japan . | |

*Primary Examiner*—Jeffery R. Thurlow
*Attorney, Agent, or Firm*—Christie, Parker & Hale, LLP

[57] ABSTRACT

A synthetic wood meal in which a thermoplastic resin material of 25 to 80 wt % is mixed with a cellulose crushed material of 20 to 75 wt % that lies in the moisture content of within 15 wt % and the mean particle diameter of 20 mesh or less, the mixed material is kneaded so as to be set to gel, and the kneaded material is cooled and pulverized and regulated to a size that lies in a particle diameter of 10 mm or less. Then, the synthetic wood meal as the cellulose crushed material is mixed in at the rate of 20 to 75 wt % to the resin material, the mixed material is kneaded by heating and squeezed by a screw or screws of an extruding die 78 in an extruder. When the extruding material 79 passes through the inner wall surface of the extruding die 78, which lines with a fluororesin sheet 24 thereon, the cellulose crushed material included in the extruding material is smoothly extruded without being subjected to large resisting force, so that a molded article 29 is molded for a product having an uniform and high density and a predetermined thickness, while applying resisting force against squeezing force given from the extruder to the molded article 29 by using a braking means, thus molding a synthetic wood board having more uniform and higher density.

24 Claims, 15 Drawing Sheets

SYNTHETIC WOOD MEAL, METHOD AND APPARATUS FOR MANUFACTURING THE SAME; SYNTHETIC WOOD BOARD INCLUDING THE SYNTHETIC WOOD MEAL, METHOD AND APPARATUS OF EXTRUSION MOLDING THEREFOR

CROSS-REFERENCE TO RELATED APPLICATION

This is a continuation of application Ser. No. 08/346,625, filed Nov. 30, 1994, now abandoned.

BACKGROUND OF THE INVENTION

1. Field of the Invention

The invention relates to synthetic wood meal including cellulose crushed material as a main molding material, a method and an apparatus for manufacturing the same, and to a synthetic wood board which is molded using the synthetic wood meal, a method and an apparatus of extrusion molding therefor. More particularly, it relates to synthetic wood meal properly used for kneading the cellulose crushed material with a thermoplastic resin material (hereinafter, referred to simply as a resin material) in an extruder to be finished to a predetermined thickness in a molding die, a method and an apparatus for manufacturing the same, and to a synthetic wood board molded by the above-mentioned extruder, a method and an apparatus of extrusion molding therefor.

With respect to the cellulose crushed materials and the resin materials mentioned above, one or both of them of many kinds have been used and discarded so much for various uses, such as daily utensils or the like, to accompany with diversification of lifestyle. Such waste materials of the thermoplastic resin molding products are regenerated as resin materials by use of a method, such as disclosed in U.S. Pat. No. 5,323,971 or the like. An aspect of the present invention is to provide wood meal in which the waste materials are used with the cellulose crushed materials mentioned above to obtain building materials or materials to form various plastics molding products, such as plastic sheets or plastic films, or which is used as a filler or a colorant. Another aspect of the present invention is to provide a method of recycling the waste materials as a synthetic wood board, or a synthetic wood board capable of recycle by itself or using with virgin pellets of other plastics.

2. Description of the Prior Art

Up to this time, various developments of molded resin products based upon the wood meal of this type have been taken place for the purpose of improvement of water resisting property, heat insulating property and the like. Especially, recent requirements, such as to conserve forest resources in view of the global environmental conservation, to consider the increasing lumber cost and to deal with the potential demand deep-rooted in the sense of wood products, have been placed on developments of resin materials capable of use as coating materials or film materials to be used on furniture and daily utensils, synthetic wood meal as building materials and synthetic wood board molded by using the synthetic wood meal, in order to obtain surface properties similar to those of natural wood.

However, in the conventional process of extrusion molding for such a synthetic wood board, when being molded by mixing a cellulose crushed material, such as wood meal or the like, obtained by crushing lumber, chaff, bagasse, crushed chip materials or pulp materials, properties of the cellulose crushed material, e.g., properties of the wood meal, such as flowability or dispersing property between the wood meal and the resin material, have had some important effect on the extrusion molding.

That is, the cellulose crushed materials, such as wood meal and the like, have a great frictional resistance during flowing, and the fit of the cellulose crushed material and the resin material is poor, so that the composition of the wood meal included in the molded synthetic wood board is made uneven, resulting in non-uniformity of density. Also, when heating after filling the wood meal and the resin material into the extruder, large amounts of steam or wood vinegar gas, such as acidic acid gas, are generated from the mixed wood meal, thereby corroding the wall surface in the extruder and wearing the molding die or the mold, or causing rough surface, bubbles or cavities on the molded synthetic wood board. Accordingly, various problems have arisen in the process of the extrusion molding.

In the cellulose crushed materials, the wood meal obtained by pulverizing wood materials, such as the above-mentioned building waste materials, sawdust generated in process of sawing lumber or shaping wood, or other lumbers, with a pulverizer that utilizes forces of impact, shear and friction, such as an impeller mill or a ball mill, may be fluffy and often include elongated and fibrous particles. Also, such wood meal is extremely inferior in its dispersing property when blended with the resin material, a solvent or a solution. The wood meal can be easily coagulated during storing the wood meal, especially having a remarkable defect of coagulation when molding the synthetic wood board. For these reasons, rugged edges, protruding portions and vilus-like fibers of the wood meal are altered into spherical or guasi-spherical particles by the pulverization by the frictional forces of the balls in the pulverizer so as to mold wood meal relatively improving the flowability and the dispersing property. However, the wood meal differs in the flowability from the resin materials even if using such an improved wood meal, and the effect of the wood meal on the molding process could not be avoided completely, so that the election of the method of molding has become an important point which instantly took measures to meet the effect of the wood meal in the process of molding.

Further, as is similar to improvement of the wood meal itself on the flowability and the dispersing property mentioned above, the synthetic wood board is molded such that the fit of the wood meal and the resin material becomes good to remain a kneaded state properly. This is also an important factor in order to mold the synthetic wood board having an uniform and high density by reducing the frictional resistance of the wood meal with the resin material having a lower frictional resistance in comparison with the wood meal. However, in the prior art, it has remained a problem that the fit of the wood meal and the resin material should be improved.

Conventional Methods for Molding a Synthetic Wood Board

In conventional methods for molding a synthetic wood board, there are typical methods, such as calendering, extrusion molding and hot pressing as shown below.

FIG. 15

The method of calendering for the synthetic wood board, for example as disclosed in Japanese Patent Publication KOKOKU NO. H4 (1992)-7283, includes the following steps: powder or pellets of the wood meal and the resin material, both that lie in the particle diameter of 80 to 300 mesh, are fed directly to a hopper of an extruder; the wood meal is blended with the thermoplastic resin material; and both are heated and kneaded in the open-type extruder; or the wood meal and the resin material, both that lie in the particle diameter of 80 to 300 mesh, are placed in a blender to mix each other sufficiently; then the mixed material is kneaded in a kneader, such as a pressure kneader or a banbury; the kneaded material is carried by the hopper to the extruder and extruded by a screw 51 in front of a pair of heating rollers 52 as shown in FIG. 15; and the extruded material are heated and formed by rolling it with a predetermined thickness by the heating rollers 52. The open-type extruder includes a simple extruding opening 54 without a molding die, and a guide 55 is provided for connecting between the opening 54 and the heating rollers 52 which is constituted from a receiving bottom plate and a side plate each having a heating mean, such as an electric heater 56 or the like, and which provides an infrared heater 57 in the upper portion thereof.

The extruding material is kept warm and heated up to the heating rollers 52 in order to avoid deformations, such as warps or distortions. The deformations are caused in case the extruding material is not in a heat accumulating state sufficiently, by which the edges of the extruding material rapidly falls and only the middle portion is pulled out in large quantities into the heating rollers 52, resulting in wrinkles in the formed material, and moreover, making the composition of the formed article non-uniform and it may also be a cause of warps or bends.

Also, the extruding material is rolled sufficiently and pulled out in the shape of a board by heating rollers 52, then the non-uniform density of the composition, being caused in the process of rolling, is altered by a correcting roller 53 to prevent the formed article from occurring the warps, and further, warps or bends of the formed article are corrected by a plurality of rollers (not shown) which press the front and back surfaces of the formed article alternately with a proper space.

In addition, a single screw or a twin screw can be used for the extruder.

FIG.16

Next, the conventional method of extrusion for the synthetic wood board, for example, as disclosed in Japanese Patent Publication KOKOKU NO. H3 (1991)-59804, includes the following steps: the wood meal is blended with the resin material; the blended material is heated and kneaded by an extruder, in which the kneaded material is extruded in the shape of a tube through a molding die 61 provided in an exhaust port of the extruder as shown in FIG. 16 (A); the molded article is cut by a cutting tool 62, such as a cutter or the like, in the extruding direction; and the molded article cut by the cutting tool 62 is opened to form an open-form molded article 63 in the shape of a board as shown in FIG. 16 (B). Then, after inserting the open-form molded article 63 between heating rollers 64, 64 to press it, the warps of the open-form molded article, being caused by stresses to try to assume it original tubular shape, are removed by a correcting roller 65, and further, warps or bends of the molded article are corrected by a plurality of rollers 66 which press the front and back surfaces of the molded article alternately with a proper space.

As described above, in the prior art, it has remained a problem that the fit of the wood meal and the resin material should be improved.

Further, when powder or pellets of the wood meal and the resin material are fed directly to a hopper of an extruder, or when the wood meal and the resin material are kneaded by a kneader, such as a blender, a pressing kneader or a banbury, so as to carry the kneaded material through the hopper into the extruder, the wood meal, being crushed in advance into a fine powder that lies in the particle diameter of 80 to 300 mesh, is used. The frictional resistance of the wood meal has some adverse effect, e.g., to burn and stick the extruding material in the process of extrusion molding, to make the composition of the product non-uniform, or to generate deformations, such as warps or distortions, so that it has been impossible to use wood meal having a large particle diameter. Also, there have been other problems such that it took a long time to crush the wood meal into a fine powder, or the fit of the wood meal and the resin material became poor by crushing the wood meal into a fine powder more than it needed.

That is, as mentioned above, the following problems have arisen in the prior art.

(1) As to the problem in the forming process, which is caused by a large frictional resistance of the wood meal during flowing, or which is caused by a bad fit of the wood meal and the resin material, the guide 55 is provided for connecting between the opening 54 and the heating rollers 52 without the molding die, and the extruding material is kept warm by heating during flowing, thereby reducing the frictional resistance of the wood meal. Further, the extruding material is rolled by using the heating rollers 52, 52, so that the material extruded by the extruder can pass between the heating rollers 52, 52 at a short interval, i.e., the distance of the contacting surfaces of the heating rollers 52, 52 with the extruded material can be reduced. As a result, the frictional effect between the wood meal and the heating rollers is minimized, thus preventing the composition of the formed synthetic wood board from being non-uniform. However, with respect to the method of calendering, the synthetic wood board is not formed by applying pressing force to the extruding material; the extruding material is pulled out only by flowing in accordance with a rotational motion of the heating rollers.

Accordingly, there has been a limit in ability of forming the synthetic wood board of high density.

(2) In the method using the guide for connecting the extruder with the heating rollers, as shown in the Japanese Patent Publication KOKOKU NO. H4 (1992)-7283, the connection is carried out by using the single screw extruder 51 or the twin screw extruder, so that there is a limit in width of the guide. Accordingly, there has been a problem such that a wide synthetic wood board could not be formed.

(3) In the formed article which is rolled by the heating rollers 52 and pulled out, the non-uniform density of the composition caused in the process of rolling is altered by the correcting roller 53 to prevent the formed article from occurring the warps, and further, warps or bends of the formed article are corrected by the plurality of rollers which press the front and back surfaces of the formed article alternately with a proper space. However, it is impossible actually to correct warps or bends of the formed article sufficiently, resulting in generating the internal and residual stresses in the formed article. Such internal and residual stresses cause distortions, such as warps or twists, of the formed article to accompany with an aged shrinking, or an expansion and a shrinking in the change of temperature, which is occurred after forming the article. Especially, in case that the secondary processing is applied to the article, for example, in case that the press processing is applied thereto by using a method of hot pressing, the internal and residual stresses cause distortions to the formed article more than it was expected.

(4) It is required in the process of calendering in combination with a great deal of related arrangements different from other molding machine, so that there has been a problem such that the cost of equipment increased extremely in comparison with the manufacturing arrangements for extrusion molding.

Next, the problems to be solved in another conventional method using a molding die will be described below.

(1) Generally, it has been considered that it was difficult to directly mold articles, which included a large amount of wood meal having high frictional resistance, through the molding die provided in the extruder. On the other hand, in the process of the extrusion molding disclosed in the Japanese Patent Publication KOKOKU NO. H3 (1991)-59804, the molding die molds the material in the shape of a tube, in which the outlet of the molding die has a round shape and the passage between the outlet thereof and the exhaust port of the extruder is relatively short, so that the frictional resistance in the process of extrusion molding is reduced as much as possible, thus forming the passage of the molding die with the intention of smooth and rapid extrusion molding of the resin material. However, when extruding the synthetic wood board using a T-die type molding die for directly molding a wide molded article, the frictional resistance of the wood meal is high, so that it has been extremely difficult to cause the extruding material to uniformly flow through a relatively long distance into the molding die of which width is wide at the beginning but becomes narrow at the end.

(2) In the method of extrusion molding disclosed in the Japanese Patent Publication KOKOKU NO. H3 (1991)-59804, after inserting the open-form molded article between heating rollers to press it, the warps of the open-form molded article, being caused by stresses to try to assume it original tubular shape, it is required to removed the warps by using the correcting roller, so that it is impossible actually to correct the warps of the molded article sufficiently as well as the case of the calendering described above, resulting in generating the internal and residual stresses in the molded article. What is more, the internal and residual stresses cause the distortions, such as warps or twists, to accompany with aged changes, and further, cause distortions to the molded article in case that the press processing is applied to the molded article by use of a method of hot pressing more than it was expected.

(3) In the method of extrusion molding disclosed in the Japanese Patent Publication KOKOKU NO. H3 (1991)-59804, it is required to removed the warps, which is caused by stresses to try to assume it original tubular shape, by using the correcting roller, as mentioned in the (2), in spite of adopting the method of extrusion molding, so that there has been a problem such that the cost of equipment increased extremely in comparison with the general manufacturing arrangements for extrusion molding.

(4) The method of extrusion molding disclosed in the Japanese Patent Publication KOKOKU NO. H3 (1991)-59804 is for molding the synthetic wood board, different from that of a general resin film and the like, in which the extruding material is molded in the shape of the tube and the tubular-shaped material is opened in the shape of the board, so that it has been difficult to mold the molded article in the shape of the thick board.

(5) In addition, when extruding a synthetic wood board of 12 mm thick or the like by use of the molding die of T-die type, the flow of the molding material becomes worse in the molding die to make the density of the molding board non-uniform, and finally, the surface of the molding board can wave or deform its shape into an unfixed form, so that there has been a problem such that the molding board could not be a product on the market.

(6) Further, when extruding a synthetic wood board by use of the molding die of T-type, the molding material becomes dirty brown because wood meals included in the molding material is burned by heaters of the molding die, and it brings a problem of an appearance of the products and also it occurs a deterioration of the impact resiting property or the like.

SUMMARY OF THE INVENTION

In order to solve the above mentioned problems, an object of the present invention is to provide synthetic wood meal which improves its dispersing property when being mixed in a solvent or a solution, such as a paint solution or a coating solution, which does not precipitate and coagulate in the paint solution, which enables to steadily keep a resin material fixed to the thermally and chemically stable wood meal; synthetic wood meal improving its flowability in order to steadily keep mixing and dispersing the synthetic wood meal and the resin material; a method and an apparatus for manufacturing the synthetic wood meal; further a synthetic wood board including the above-mentioned synthetic wood meal, which properly keeps the fit of the wood meal and the resin and prevents bubbles or cavities from generating around the wood meal granules, and which enables to have a thickness in a wide range of a thin board to a thick board keeping density between wood meal granules to be uniform and high; and a method of extrusion molding for the synthetic wood board.

Especially, the object of the present invention is to provide a synthetic wood board having a thickness of 10 mm or more, and a method of extrusion molding and an extruder therefor.

It is another object of the present invention is to provide a method of extrusion molding for molding a wide synthetic wood board having low internal and residual stresses, and an extruder therefor.

In order to achieve the above-mentioned objects, according to the present invention, synthetic wood meal is formed by which the moisture content of the synthetic wood meal is set to within 15 wt %, and then, a first raw material consisting of a resin material of 25 to 80 wt % is mixed with cellulose crushed materials of 20 to 75 wt % having a mean particle diameter of 20 mesh or less, the mixed material is kneaded to be set to gel, the kneaded material is cooled, pulverized and regulated to have a particle diameter of 10 mm or less.

Then, a method for manufacturing the synthetic wood meal includes at least the steps of mixing the raw material by using stirring and impact-applying blades, kneading to be set to gel by frictional heat, cooling and pulverizing the kneaded material, and regulating pulverized material to a size that lies in a particle diameter of 10 mm or less.

Further, an apparatus for manufacturing the synthetic wood meal includes a flow-mixing and kneading means provided with the stirring and impact-applying blades for mixing the first raw material and kneading the mixed material to be set to gel by the frictional heat, a cooling granulation means provided with a stirring and crushing blade therein for granulating the kneaded material, and an inlet and an outlet for cooling water in a jacket, and a size regulation means for regulating the pulverized wood meal to a size that lies in the particle diameter of 10 mm or less.

According to another aspect of the present invention, a synthetic wood board is obtained from which the above-mentioned synthetic wood meal is heated, milled and squeezed into a molding die by a screw, and from which the squeezed material is cooled while applying control force against the squeezing force to the squeezed material so as to make density thereof high.

A first method of extrusion molding for the synthetic wood board includes at least the steps in which the first raw material is mixed by the stirring and impact-applying blades, the mixed material is kneaded to be set to gel by the frictional heat, the kneaded material is cooled and pulverized, the pulverized material is regulated to a size that lies in the particle diameter of 10 mm less so as to form a synthetic wood meal, the size regulated synthetic wood meal is heated, milled and squeezed into the molding die by a screw, and the squeezed material is cooled while applying control force against the squeezing force to the squeezed material so as to make density thereof high.

Then, a second method of extrusion molding for the synthetic wood board includes the steps in which a second raw material is prepared by mixing a cellulose crushed material, for example, wood meal, at the rate of 20 to 75 wt %, and preferably, 30 to 70 wt % to the resin material; the second raw material is heated, milled and squeezed into the molding die 10 by a screw; and the squeezed material 79 is squeezed into a molding portion 21 of a molding die 10 having an inner wall layer, being formed by lining the inner wall with a resin sheet 24, such as polyfluoroethlyene or the like (in the specification, referred to simply as fluororesin), having an excellent heat resisting property and a low frictional resistance, or by coating the inner wall with the fluororesin, so as to be finished to a predetermined thickness, while cooling slowly in the molding portion 21 so as to be extruded.

In addition, the resin materials used for the second raw material are thermoplastic resin molding materials, such as PVC (polyvinyl chloride), PET (polyester), or PP (polypropylene), and the resin materials are all formed out of plastics recovered from waste resin products, or the recovered plastics materials mixed with virgin plastics pellets in a proper ratio of, for example, one to one. The mixture ratio of the second raw material and the cellulose crushed materials becomes as follows:

(1) In Case of Resin Material PP

The cellulose crushed material can be mixed in at the rate of within 75 wt %, and the range of mixing thereof is 20 to 75 wt %, preferably 30 to 70 wt %, and more preferably 30 to 65 wt %.

(2) In Case of Resin Material PET

The cellulose crushed material can be mixed in at the rate of within 75 wt %, the range of mixing thereof is 20 to 60 wt %, and preferably 35 to 50 wt %.

(3) In Case of Resin Material PVC

The range of mixing the wood meal is 30 to 60 wt %, and preferably 25 to 45 wt %.

According to another method of extrusion molding for the synthetic wood board, in addition to the second method of extrusion molding, the method includes the steps in which control force against the squeezing force is applied to a molded article 29 during squeezing the second raw material by a braking means; and resisting force against the squeezing force is applied through the article 29 to the extruding material 79 in a molding chamber 22 so as to make the extruding material 79 have a high density in the molding portion 21.

Also, the extruding material 79 can be squeezed into the molding portion in the molding die 10 by heating in an lead-in portion 11 of the molding die 10.

An extruder for a synthetic wood board according to the present invention including a extruding die 78 of the extruder, which squeezes the second raw material by a screw or screws after heating and milling the second raw material, is connected with the molding die 10 which includes the lead-in portion 11 for heating the extruding material 79 discharged from the extruding die and the molding portion 21 provided with a molding chamber 22 for molding the extruding material 79 squeezed from the lead-in portion 11 with a predetermined thickness. Also, an inner wall layer is provided on the surface of the molding portion 21 which is formed out of fluororesin or the like, and a cooling means is provided in the molding die for cooling the molding chamber 22.

Further, according to an extruder for the above-mentioned synthetic wood board, in addition to the apparatus for manufacturing the above-mentioned synthetic wood meal, a extruding die of the extruder, which squeezes the synthetic wood meal by a screw or screws after heating and milling the synthetic wood meal, is connected with a molding die which includes a lead-in portion for heating the extruding material discharged from the extruding die and a molding portion provided with a molding chamber for molding the extruding material squeezed from the lead-in portion 11 with a predetermined thickness, while an inner wall layer is provided on the surface of the molding portion, which is formed out of fluororesin or the like, and a cooling means is provided in the molding die for cooling the molding chamber.

In addition, wood meal of 60 to 75 wt %, being used for the cellulose crushed material of the first raw material, is preferably mixed with a resin material of 25 to 40 wt %, such as polypropylene or polyethlyene.

Similarly, the wood meal of 60 to 65 wt %, being used for the cellulose crushed material, is preferably mixed with one or more resin materials of 35 to 40 wt % from polycarbonate, nylon and PVC.

In addition, polytetra-fluoroethylene (Teflon TFE; TM: Du Pont Ltd.), fluoroethylene-propylene copolymer (Teflon FEP), polytri-fluoroethylene chloride (Teflon CTFE), polyfluorovinylidene (Teflon VdF) and the like can be used as the fluororesin.

Also, the method for coating the surface of the inner wall of the molding chamber 22 and the surface of the guide plate including the steps of lining the sheet 24, which is formed by coating a fluororesin layer on a glass woven fabric, is preferably used due to easy exchange and easy processing, so that it can be excellent in durability. In stead of the glass woven fabric, a nonwoven fabric of glass fiber may be used.

Then, although the inner layer on the wall surface of the molding chamber 22 can be formed on the surfaces of the inner wall of the molding chamber 22 facing the front and back surfaces of the molded article, it is desirable to line with the fluororesin sheet on the overall surface of the inner wall of the molding chamber 22.

Also, in the cooling means for cooling the molding chamber 22, cooling pipes 25 for circulating cooling water is installed in the molding die 10 around the molding chamber 22, and preferably, the cooling pipes 25 is installed so as to decrease the distance between the pipes 25 gradually in an ejecting direction of the molding portion 21. However, the invention is not limited to such an arrangement.

Further, a braking means for applying control force against the squeezing force of the molded article squeezed from the molding die can be provided.

According to the present invention, while the extruding material 79 is kept warm by heating in the lead-in portion 11 to keep the flowability and the proper kneaded state thereof. if the guide plate 15 is provided, the guide plate 15 prevent the extruding material 79 located in the lead-in portion 11 from varying in the molecular orientation caused for the reason that the coefficient of linear expansion is different between the end portion and the central portion in the discharging direction depending upon the raw material, with making the linear expansion uniform, with controlling the molecular orientation, and the extruding material 79 is diffused uniformly into the molding chamber 22 of the molding portion 21 so as to be extruded with uniform density. The surface of the inner wall of the molding chamber 22 includes the inner layer formed of the fluororesin having a small coefficient of friction, so that the cellulose crushed material in the extruding material 79 flows smoothly without receiving a large resistance, whereby it is extruded keeping the uniform and high density. In the process of extruding through the molding chamber 22, the extruding material 79 is slowly cooled by a cooling medium, such as water or oil under the normal temperature or at a temperature of 60° to 90° C., so as to mold the article 29. Since the fluororesin has a lower coefficient of heat conduction in comparison with metal and an excellent heat resisting property, the extruding material 79 is slowly cooled so that distortion caused by cooling is reduced, thus molding a synthetic wood board corresponding to the article 29 for a product that can reduce the distortion and has an uniform and high density.

Further, according to the present invention, the control force against the squeezing force from the extruder is applied to the article 29 by the braking means 30, the resisting force against the squeezing force is applied through the article 29 to the extruding material 79 in the molding chamber 22. For example, using a pair of rollers 31a and 31b for pressure welding the article 29 holding the front and back surface thereof, a frictional member is pressed and welded to a drum 33 provided in one end of the pair of rollers 31a and 31b, so that the rotation of the rollers 31a and 31b by squeezing force of the article 29 is controlled, whereby the rollers 31a and 31b can apply the control force against the squeezing force to the article 29.

Then, the control force applies the resisting force through the article 29 to the extruding material 79 in the molding portion 21 and the lead-in portion 11 against the squeezing force of the material 79 given from the extruder in the molding chamber 22, thereby making the density of the overall material 79 more uniform and higher. Accordingly, the synthetic wood board including a large amount of cellulose crushed material is molded with a further uniform and high density.

BRIEF DESCRIPTION OF THE INVENTION

The objects and advantages of the invention will become understood from the following detailed description of preferred embodiments thereof in connection with the accompanying drawings in which like numerals designate like elements, and in which.

Figure 8:
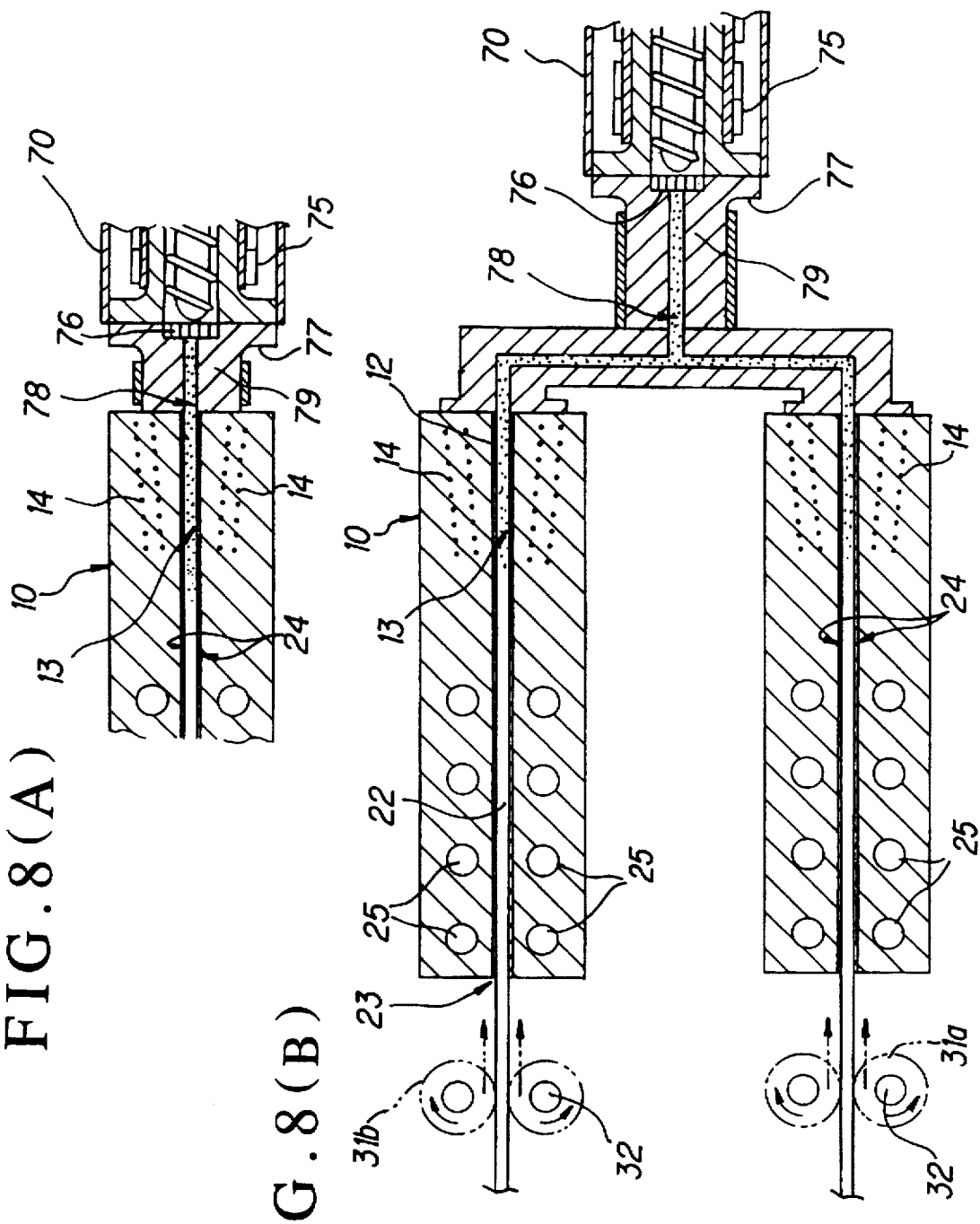
Figure 9:
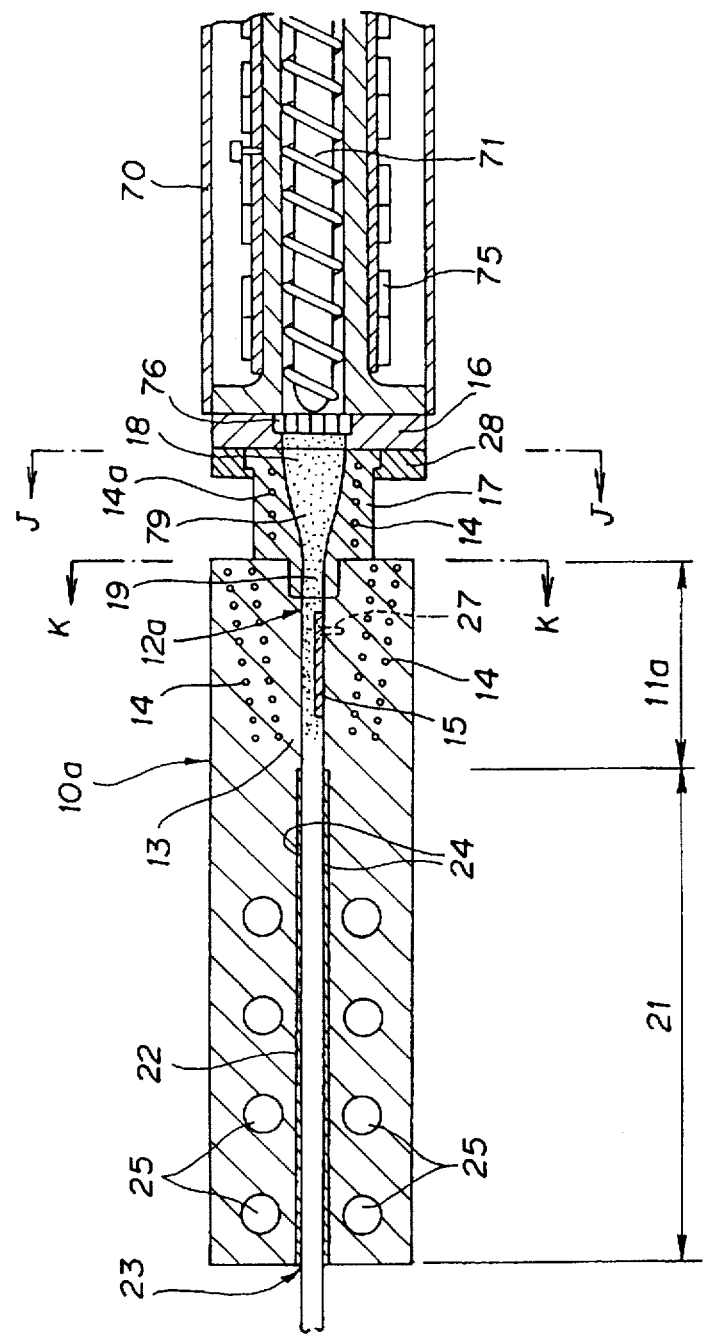
Figure 10:
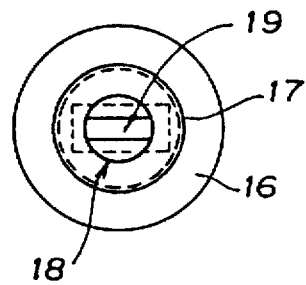
Figure 11:
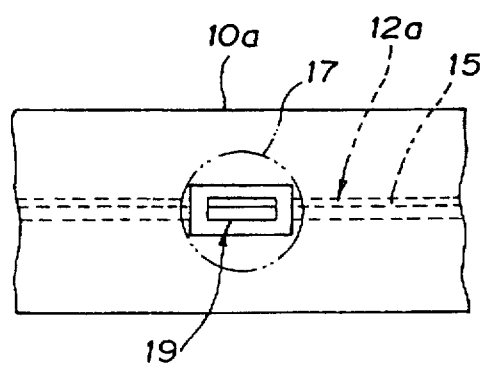
Figure 12:
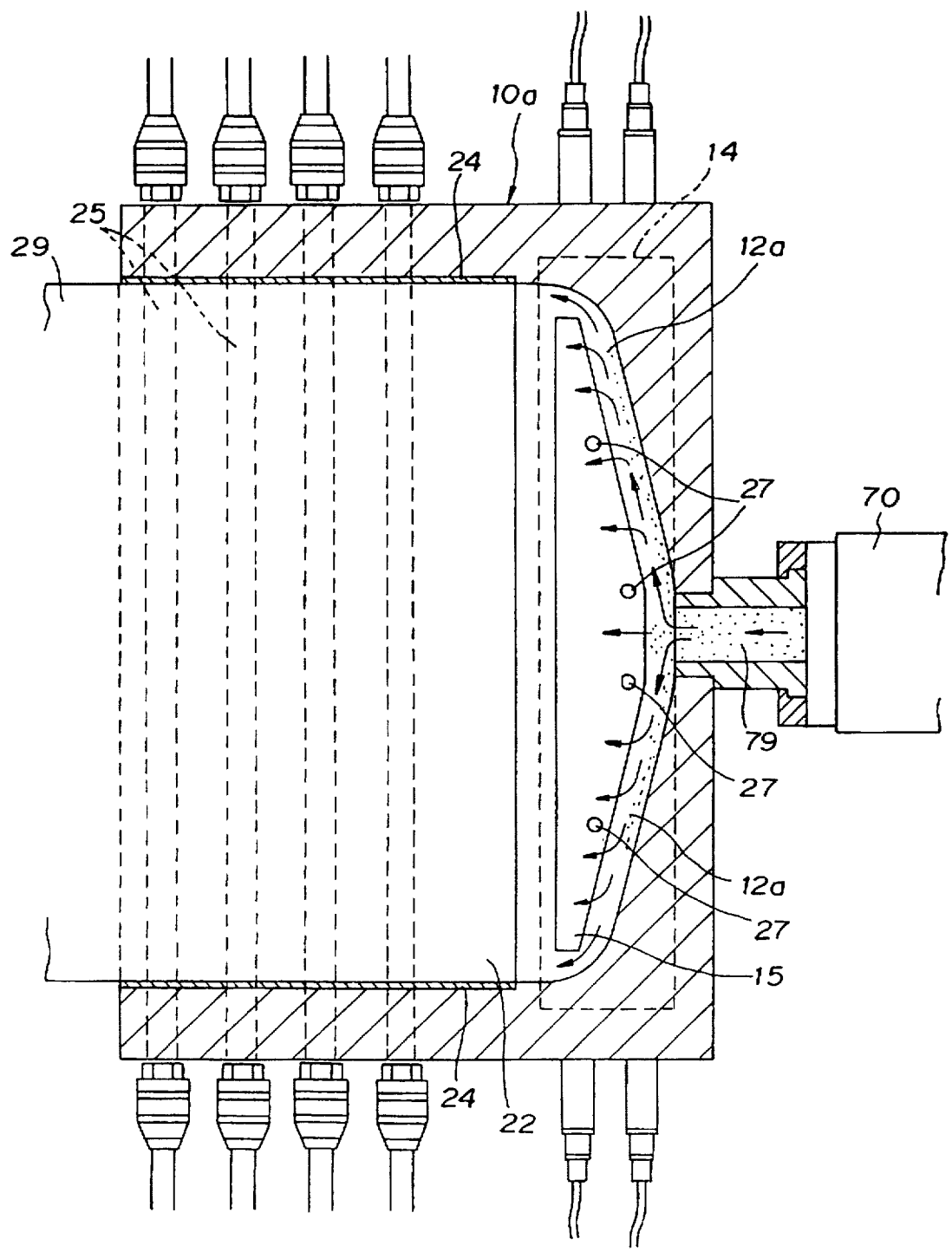
Figure 13:
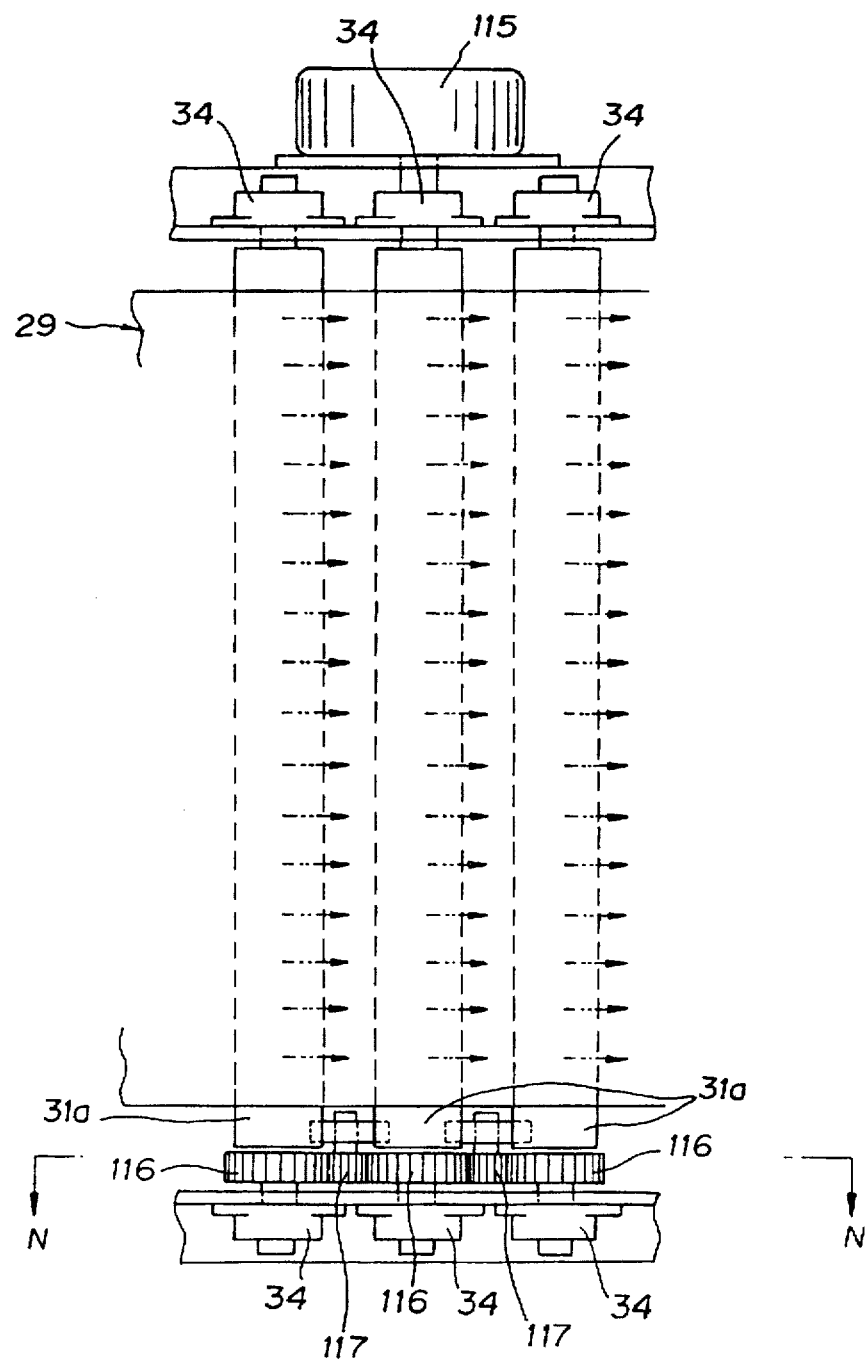
Figure 14:
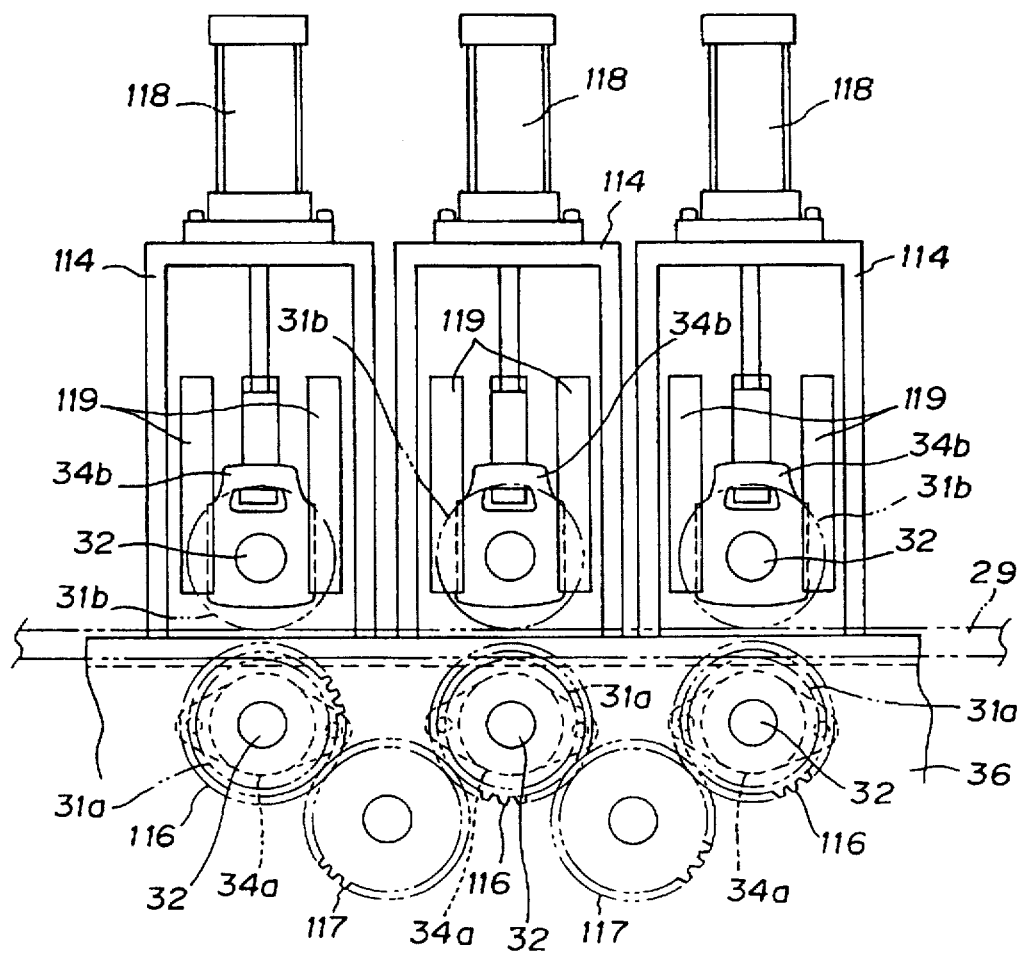
Figure 15:
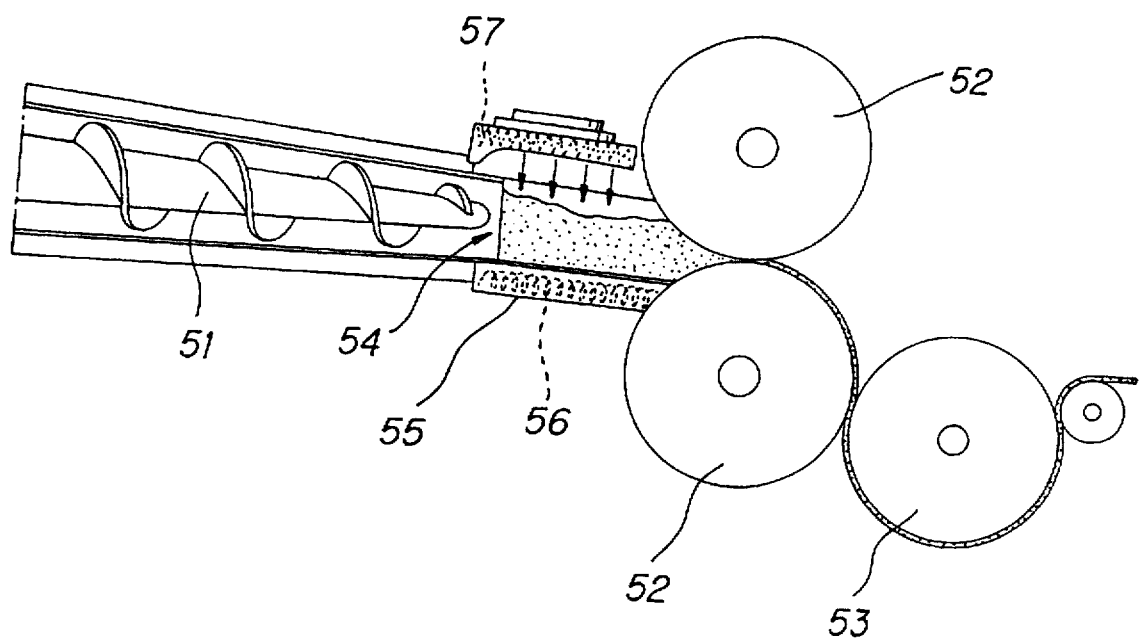
Figure 16A:
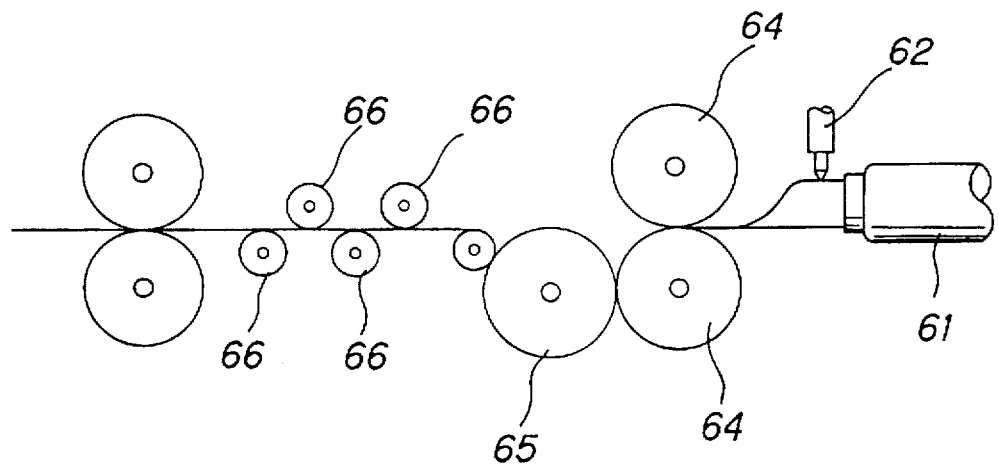
Figure 16B:
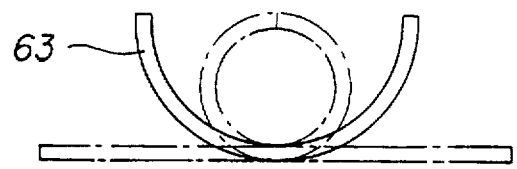

FIGS. 8 (A) and 8 (B) are partially sectional views according to another embodiment of the present invention;

FIG. 9 is a front view showing a partly section of a molding die used in the embodiment of FIGS. 8 (A) and (B);

FIG. 10 is a vertical sectional view of FIG. 9, taken along line J—J;

FIG. 11 is a vertical sectional view of FIG. 9, taken along line K—K;

FIG. 12 is a plan view showing a partly section of a molding die used in another embodiment of the present invention;

FIG. 13 is a plan view showing a partly section of a braking means used in another embodiment of the present invention;

FIG. 14 is a vertical sectional view of FIG. 13, taken along line N—N;

FIG. 15 is a front view of an apparatus showing a conventional method of calendering; and FIG. 16 (A) is a front view showing a conventional method of extrusion molding, and FIG. 16 (B) is a schematic view showing states of a molded article of tubular-shaped and an open-form molded article according to a conventional method of extrusion molding.

DETAILED DESCRIPTION OF THE PREFERRED EMBODIMENTS

FIG. 1

Figure 1:
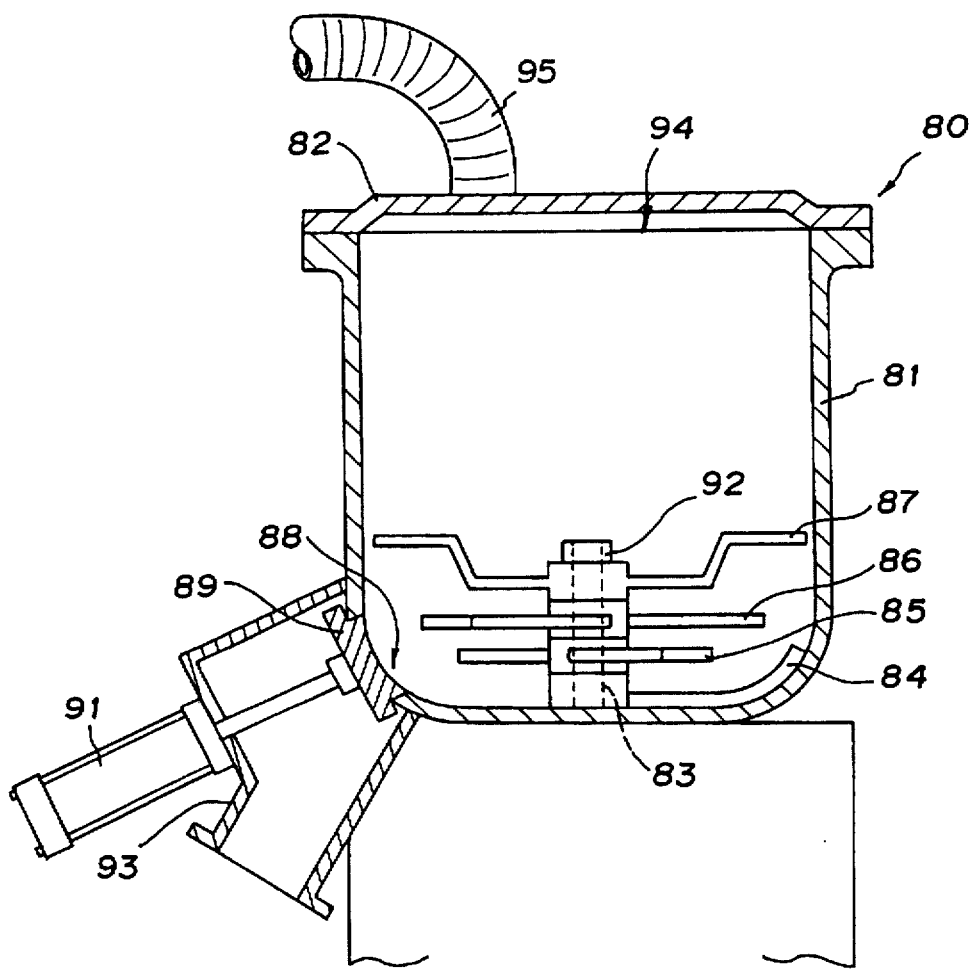
FIG. 1 is a front view showing a partly section of a mixer (flow-mixing and kneading means) used in an embodiment of the present invention.

In FIG. 1, reference numeral 80 shows a flow-mixing and kneading means for forming "kneading material" by mixing and kneading raw materials, which is referred as a "mixer" in the embodiment for convenience.

A mixer body 81 has a casing which has a capacity of 300 liters and is formed into a cylindrical shape provided with an opening on the upper side thereof. The opening is a feeding port 94 for feeding raw materials into the mixer body 81, which is provided with an upper cover 82 capable of opening and closing thereon. The upper cover 82 is connected with a gas exhaust pipe 95 for exhausting large amounts of steam or wood vinegar gas generated from wood meal inside the mixer body 81. Also, an exhaust port 88 is provided around the side adjacent to the bottom of the mixer body 81, in which a cover 89 is provided at the end of a rod of a cylinder 91 so as to enable the exhaust port 88 to open and close according to the operation of the cylinder 91. Then, an exhaust duct 93 is connected with the exhaust outlet 88.

Further, a shaft 83 is placed in the center of the bottom surface of the mixer body 81 and supported upwardly therein by an unillustrated rotary drive means of a 37 KW (DC) motor so as to rotate at a high rotational speed of 820 rpm/max. The shaft 83 is equipped with a scraper 84 and stirring and impact-applying blades 85, 86 and 87 mounted in order from the bottom by fastening with a clamping nut 92 from the end of the shaft 83. In the embodiment, although the shapes of the stirring and impact-applying blades 85, 86 and 87 are respectively twin blades symmetric with respect to the center of the shaft 83, the blades are not particularly limited thereto. As shown in FIG. 1, the embodiment adopts three pairs of stirring and impact-applying blades consisting of six blades which are arranged to form equal angles (60°) on the plane, dividing 360° into six equal parts. In addition, even if a plurality of stirring and impact-applying blades other than three pairs of the blades are used, it will be preferable to arrange each other to form equal angles dividing 360° in order to knead the raw materials effectively.

The scraper 84 rotates slightly sliding the bottom surface of the mixer body 81 and scrapes the kneaded raw materials not to remain on the bottom surface of the mixer 81 while circulating the raw materials.

The raw materials including wood meal which are fed from the feeding port 94 after opening the upper cover, and which are constituted from a cellulose crushed material, a resin material and agents, such as urea, calcium carbonate, titanium oxide or pigments.

Adding calcium carbonate produces proper size stability to the synthetic wood board of the present invention and remarkably contributes to reducing expansion and shrinking according to a change in temperature, thereby preventing molded articles from deformation in the process of extrusion molding. Also, the calcium carbonate has the advantage of a low price.

Adding titanium oxide produces proper flowability and dispersing property into the solution and remarkably contributes to reducing expansion and shrinking according to a change in temperature.

The resin material can be formed out of one of or a combination of PVC (polyvinyl chloride), PET (polyester) PP (polypropylene), PC (polycarbonate) and nylon, which is immediately recovered from waste molded resin articles mentioned above as a raw-form material. Alternatively, that raw-form of resin material is recovered from resin articles including a coated resin film thereon, in which the resin articles are crushed into small pieces, the crushed small pieces are ground to separate their resin film by the application of compression grinding-effect, the ground pieces are pressed and pulverized by the application of compression impacts based on fine vibrations and pieces of resin film separated by the pulverizing pressure are removed at all times.

Further, the resin material can be formed out of a raw-form of resin material which recycles the recovered resin material obtained from waste materials of thermoplastic molded resin articles, which applies a virgin thermoplastic resin material, or which blends the recovered resin material with the virgin thermoplastic resin material in a proper ratio of, for example, one to one.

The range of wood meal amount capable of gelation every resin material for the first raw material will be described below.

In case of PP:

The amount of the wood meal is 35 to 75 wt %, while the PP is 25 to 65 wt %; and preferably, the wood meal is 60 to 75 wt %, while the PP is 25 to 40 wt %.

In case of PET, the range of the wood meal amount is the same as that of the case of PP.

In case of PC:

The amount of the wood is 40 to 70 wt %, while the PC is 30 to 60 wt %; preferably, the wood meal is 60 to 65 wt %, while the PP is 35 to 40 wt %; and more preferably, the wood meal is 64 wt % and the PC is 36 wt %.

In case of PVC:

The amount of the wood meal is 30 to 65 wt %, while the PVC is 35 to 70 wt %; and preferably, the wood meal is 45 to 55 wt %, while the PVC is 45 to 55 wt %.

In case of nylon, the range of the wood meal amount is the same as that of the case of PC.

FIG. 2

Figure 2:
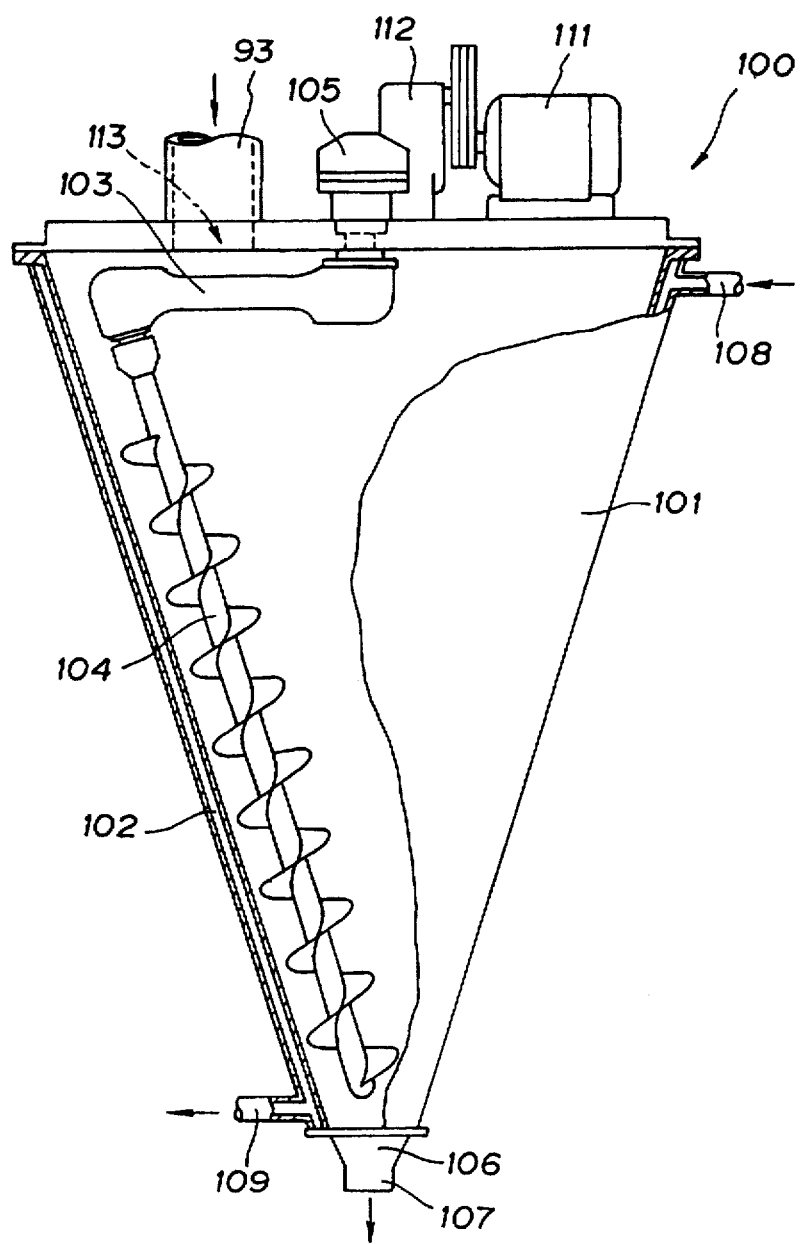
FIG. 2 is a front view showing a partly section of a cooling mixer (cooling granulation means) used in the embodiment of the present invention.

In FIG. 2, reference numeral 100 shows a cooling granulation means for forming "granulated wood meal" by mixing and stirring the kneading material described above, which referred as a "cooling mixer" in the embodiment.

A mixer body 101 was a casing which is formed into a reverse conical shape provided with an opening on the upper side thereof. On the other hand, an exhaust port 107 is provided at the end of the mixer body 101, in which a valve 106 is provided so as to enable the exhaust port 107 to open and close. Then, a jacket 102 is formed around the side of the mixer 101, in which cooling water is supplied from a feeding water pipe 108 to a drain pipe 109 at all times to cool the temperature of the raw material in the cooling mixer 100 up to the neighborhood of the melting point of the resin material. In addition, an exhaust duct, not shown, for exhausting steam or wood vinegar gas generated in the cooling mixer 100 is connected with the inside of the cooling mixer 100 through the upper wall surface of the cooling mixer body 101.

Further, an arm 103 is placed near the center of the upper wall of the cooling mixer body 101. The arm 103 is axially supported substantially in the horizontal direction inside the cooling mixer body 101 and driven by a motor 111 through a reduction gear 112 so as to rotate at a rotational speed of 3 rpm. The rotating shaft of the arm 103 is a hollow shaft in which another rotating shaft rotating independent of that of the arm 103 is provided to connect the output shaft of the motor 105. On the other hand, a stirring and crushing blade 104 is supported at the end of the arm 103, which is a screw type in the embodiment and which extends its axis of rotation to the lower end of the cooling mixer body 101 along the inner wall side thereof substantially parallel thereto. The stirring and crushing blade 104 is connected to a rotating shaft that is connected to the output shaft of the motor 105 through a turning-force transmitting mechanism consisting of gears or the like provided in the arm 103 and driven to rotate at a rotational speed of 90 rpm.

In addition, a feeding port 113 is provided on the upper wall of the cooling mixer body 101, to which the exhaust duct 93 of the mixer 80 is connected.

The kneaded material formed in the mixer 80 is fed via the exhaust duct 93 from the feeding port 113 of the cooling mixer 100 into the cooling mixer body 101. The stirring and crushing blade 104 is rotated by the motor 105 at the rotational speed of 90 rpm while the arm 103 is rotated by the turning force of the motor 111, which is reduces the speed via the reduction gear 112, in the horizontal direction at the rotational speed of 3 rpm, so that the stirring and crushing blade 104 rotates to trace the conical shape along the inner wall surface of the cooling mixer body 101, thus stirring the kneaded material inside the cooling mixer 100. The kneaded material is cooled on the inner wall surface of the cooling mixer body 101 by the cooling water flowing inside the jacket 102 so as to form the "granulated wood meal" by granulating its diameter to 25 mm or less. Then, the granulated wood meal discharged from the exhaust port 107 by releasing the valve 106.

In addition, the kneaded material, which is cooled in the cooling mixer 100, is preferably cooled at the freezing point, i.e., less than the the melting point of the resin material included in the raw material, however, it is not required to lower the temperature below the melting point thereof since the wood meal is blended therein, so that it would be enough to be cooled up to the temperature capable of release of the granulated wood meal from the exhaust port 107 in practice, i.e., up to the temperature 10° C. higher than that of the melting point of the resin material included in the raw material.

For example, in the case PP is used for the resin material, the melting point of the PP is 165° C., so that the kneaded material, being in a gelling state, is cooled up to the temperature range of 90° to 100° C. for about 10 to 15 min. after feeding it into the cooling mixer 100, thus efficiently realizing the cooling granulation process in the cooling mixer. As to the cooling water flowing inside the jacket 102, the temperature thereof supplied from the feed water pipe 108 was 30° C., while the temperature thereof drained from the drain pipe 109 was 40° C.

In addition, the cooling granulation means of the present invention is not limited to such an apparatus as the cooling mixer, so that it is possible to use other apparatuses which are provided with a stirring blade for stirring the kneaded material inside a mixer body and a jacket around the side of the mixer body, as mentioned above, for cooling the kneaded material inside the mixer body by the cooling water flowing inside the jacket.

Also, it is considered that the kneaded material formed by the mixer 80 can be cooled only by stirring it inside a general mixer without the jacket 102, however, in this case, even if being cooled up to the temperature 10° C. higher than that of the melting point of the resin material included in the kneaded material, the cooling takes about 30 min., so that it would be desirable to form the granulated wood meal by using such a cooling granulation means of the cooling mixer as mentioned in the embodiment.

FIG. 3

Next, the granulated wood meal formed by the cooling granulation means is regulated to a size that lies in a particle diameter of 10 mm or less so as to form "synthetic wood meal".

Figure 3:
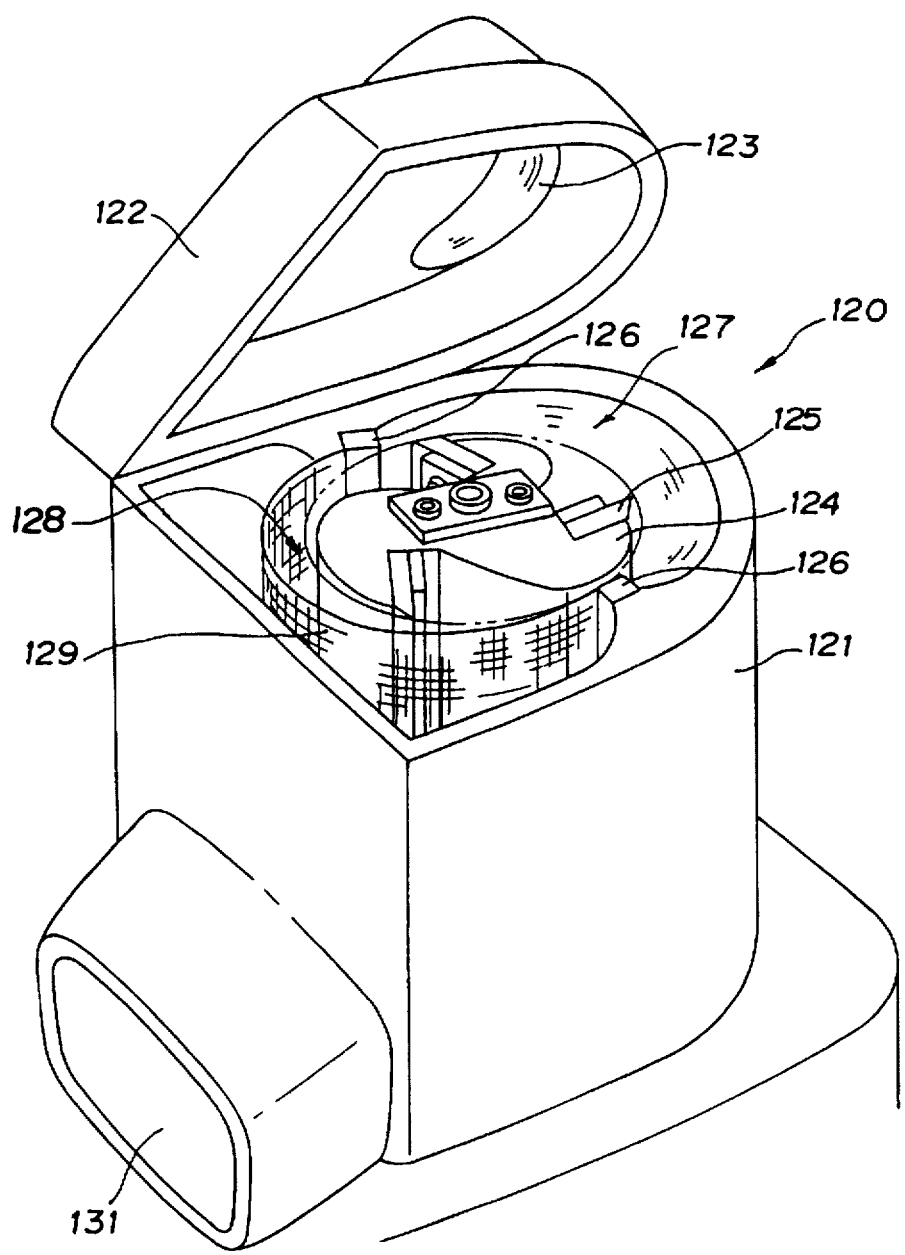
FIG. 3 is a perspective view showing a partly section of a cutter mill (size regulating means) used in the embodiment of the present invention.

In FIG. 3, reference numeral 120 shows a size regulation means for regulating the size of the granulated wood meal, which referred as a "cutter mill" in the embodiment.

A cutter mill body 121 has a casing which is formed into a cylindrical shape provided with an opening 122 on the upper side thereof. The opening 122 is a feeding port 123 for feeding the granulated wood meal into the cutter mill body 121, which is provided with a cover 122 capable of opening and closing thereon.

Further, a cutter supporting body 124 is provided on the bottom surface of the cutter mill body 121 and rotated by a rotary drive means, not shown, in the horizontal direction, to which three rotary blades 125, being enlarged in the up-and-down direction, are provided around the outer surface thereof so as to be arranged to make an equal angle of 120° in the rotating direction of the cutter supporting body 124 and to keep the edges thereof in the same rotational locus. Also, two fixed blades 126 are fixed in the cutter mill body 121 which are placed substantially to be symmetry with respect to the rotational locus of the rotary blades 125 and which leave a slight space to the rotational locus of the rotary blades 125. Then, the two fixed blades 126 and the cutter supporting body 124 with the rotary blades 125 divide the cutter mill body 121 into two areas, one feeding chamber 127 and the other size regulating chamber 128. The feeding port provided on the cover 122 is connected to the feeding chamber 127. In addition, the spaces between the two fixed blades 126 and the rotary blades 125 can adjust freely to be able to regulate the granulated wood meal into a desired size. Also, the size regulating chamber 128 is divided between the two fixed blades 126 to sround the rotational locus of the rotary blades 125 with a screen 129. In the embodiment, the screen 129 is formed of a mesh through which granules for the "synthetic wood meal" regulated to the size of about 8 mm can pass. Further, an exhaust port 131 is provided on the lower side of the size regulating chamber 128 of the cutter mill body 121 for discharging the size regulated granules from the cutter mill 120.

In the cutter mill 120 mentioned above, after the granulated wood meal formed in the cooling mixer 100 is fed from the feeding port 123 of the cover 122, the cutter supporting body 124 is rotated by the rotary drive means, not shown, so that the granulated wood meal is regulated to the size that lies in the particle diameter of 0.1 to 8 mm, between rotary blades 125 provided in the cutter supporting body 124 and the fixed blades 126 so as to form the synthetic wood meal as a first raw-form material, thus forming the synthetic wood meal which gives the proper flowability for keeping the mixing and dispersing properties between the resin material and the wood meal in a steady state i.e., for enabling to steadily keep the resin material fixed to the thermally and chemically stable wood meal, and which does not depend upon chemical reactions and adhesion in cooperation with condensing and reducing actions. Then, the synthetic wood meal passes through the mesh of the screen 129 provided in the size regulating chamber 128 so as to be discharged from the exhaust port 131 and fed into an extruder 70 for the next process.

FIG. 4

Figure 4:
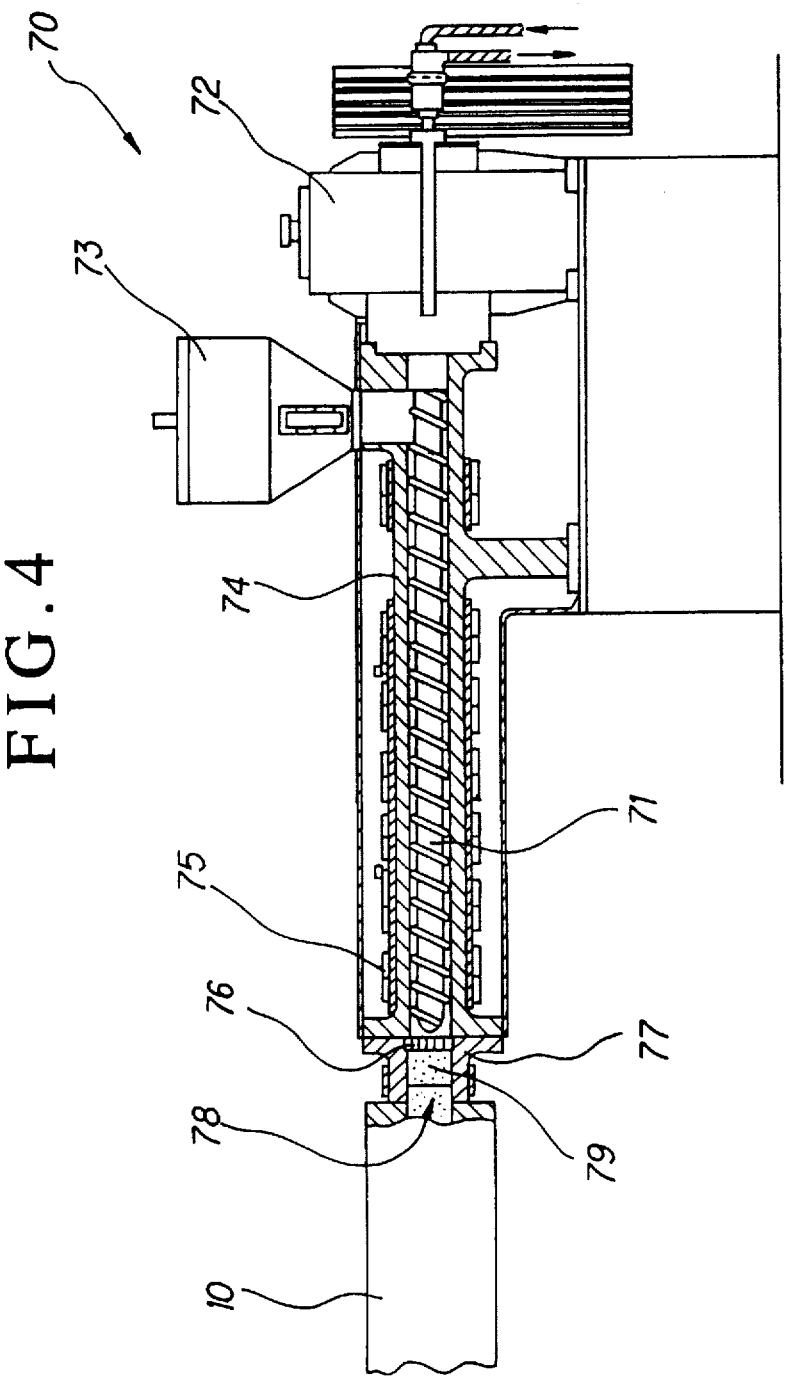
FIG. 4 is a front view showing a partly section of an extruder used in the embodiment of the present invention.

In FIG. 4, reference numeral 70 shows a single screw extruder. Generally, typical extruders are provided with one or more screws therein that can be roughly classified into two groups, single screw type and multi screw type, in which there are various deformed or combined structures. The present invention can use any of such extruders.

A screw 71, being a single screw type, is driven by an unillustrated motor through a reduction gear 72 and rotated inside a barrel 74. By using the rotary screw 71, a cellulose crushed material and a resin material for a second raw-form material fed from a hopper 73 are kneaded and pushed out in front of the screw 71. On the outer surface of the barrel 74, band heaters 75 is provided to heat the cellulose crushed material and the resin material, so that the cellulose crushed material and the resin material are melted gradually while being conveyed along the groove of the screw 71 in forward direction and kneaded, thus squeezing the kneaded material for an extruding material through a screen 76 and adapter 77 from an extruding die 78 of the adapter 77 to a molding die 10.

The raw materials fed into the hopper 73 are a cellulose crushed material and a resin material for the second raw-form material. Especially, in the raw materials, the wood meal forms a fine powder material that lies in a particle diameter of 50 to 300 mesh, preferably 60 (minimum) to 150 (maximum) mesh, with the intention of good fitting to the resin material and reducing the frictional resistance of the wood meal in the process of extrusion molding so as to prevent wear and damage of the extruder. The moisture content of the wood meal is maintained to within 15 wt %.

preferably within 11 wt %, and more preferably, within 3 to 5 wt %, with the intention of vaporization of wood vinegar gas generated in the process of molding and avoiding the generation of steam and bubbles so as to prevent rough surface.

In order to further improve the properties of the wood meal, it is possible to use another method for forming wood meal in which a material, such as wood chips or the like, is dipped or added into an urea resin adhesive and cured by heating, and the cured material is crushed to form powder that lies in a particle diameter range of 50 to 300 mesh. In such a method for forming wood meal, the wood vinegar gas generated from the wood meal is removed rapidly by neutralizing and vaporizing actions given in the process of thermosetting especially while being neutralized in the urea resin adhesive, and then, a cured adhesive surface is formed around the wood meal, so that the wood meal is effectively prevented from a increase in the moisture content, thereby improving the sliding property of the wood meal, and especially, reducing the frictional resistance in the process of extrusion molding.

The resin material can use one of or a combination of PVC ((polyvinyl chloride), PET (polyester), PP (polypropylene) and the like, which is immediately recovered from waste molded resin articles mentioned above as a raw-form material. Alternatively, that raw-form of resin material is recovered from resin articles including a coated resin film thereon, in which the resin articles are crushed into small pieces, the crushed small pieces are ground to separate their resin film by the application of compression grinding-effect, the ground pieces are pressed and pulverized by the application of compression impacts based on fine vibrations and pieces of resin film separated by the pulverizing pressure are removed at all times.

In case of using PP for the resin material, the wood meal can mix up to 75 wt % therewith. The amount of wood meal enabling to mix with the resin material is 20 to 75 wt %, and preferably 30 to 70 wt %.

The mixing amount of the wood meal is determined in accordance with the directing properties, such as the wear resisting property and the like. In the present invention, the wood meal can be mixed abundantly since various bad effects in the molding process are eliminated.

In case of PET, the wood meal can mix up to 60 wt % therein, however, the preferable mixing rate is 20 to 60 wt %.

In case of PVC, the mixing rate of the wood meal is 30 to 60 wt %, and preferably, 45 wt %.

Further, in the process of extrusion molding, a raw-form of resin material which recycles the recovered resin material obtained from waste materials of thermoplastic molded resin articles, or a virgin thermoplastic resin material, or a recovered resin material blended with a virgin thermoplastic resin material in a proper ratio of, for example, one to one can be fed into the above-mentioned extruder.

In addition, according to applications, it is possible to add pigments to color the articles.

Also, as mentioned above, when the synthetic wood meal that is adopted in the present invention is fed in the hopper 73 of the extruder 70, the fit of the wood meal and the resin material is further improved, thereby enabling to reduce the frictional resistance of the wood meal so as to form a proper kneaded material.

FIG. 9

In FIG. 9, an adapter 17 is provided with an inflow port 18 from which an extruding material 79 kneaded in the extruder 70 flows in and an extruding die 19 for discharging the extruding material 79 to a molding die 10a described later. Also, the adapter 17 is provided with a projecting portion having a rectangular cross section at the end thereof. The extruding die 19 is formed into an elongated rectangular shape that is 50 mm in width and 12 mm in height so as to form the thickness of 8 mm at the end of the projecting portion (see FIG. 10). The inflow port 18 is formed into a circular shape from which a connecting orifice is formed changing the cross sectional shape gradually toward the extruding die 19. In addition, the inflow port 18 is formed in the same size as that of the discharging port of the extruder 70, which has a circular shape. On the other hand, it is preferable to form the width of the rectangular extruding die 19 in the same size as that of the diameter of the inflow port 18 and the height thereof in the same size as that of a molding chamber 22 of the molding die 10a described later.

In addition, it is possible to form the adapter 17 in various sizes according to the size of the extruder 70, for example, in the case the diameter of the inflow port 18 is 150 mm, the extruding die 19 can shows the rectangular shape that is 150 mm in width and 12 mm in height which is the same height as the molding chamber 22.

The back end of the adapter 17 is fastened onto the end surface of a screen portion 16 provided with the screen 76 with a fastener, such as a bolt or the like, through a fixture 28 interlocked around the adapter 17 so as to couple the inflow port 18 of the adapter 17 to the outlet of the screen portion 16 of the extruder 70. On the other hand, a concave portion having a rectangular cross section is formed substantially in the center of the back end surface of the molding die 10a in which the projecting portion having a rectangular cross section provided at the end of the adapter 17 is inserted so as to couple the extruding die 19 into a lead-in orifice 12a of the molding die 10a.

In addition, according to the embodiment, a heater 14a is laid inside the surrounding wall of the connecting orifice of the adapter 17.

The extruding material 79 squeezed from the outlet of the screen portion 16 of the extruder 70 flows in from the inflow port 18 of the adapter 17 and runs from the extruding die 19 to the lead-in orifice 12a of the molding die 10a through the connecting orifice while being kept warm by heating. Although the change in the cross section of the connecting orifice from the inflow port 18 up to the extruding die 19 become relatively rapidly narrow, the change is only given in the height, so that the flowing state of the extruding material 79 is not complicated to be in a proper state. Also, the extruding die 19 has a larger injection port than that of general dies so that a large amount of melted synthetic wood meal can be discharded. Moreover, the extruding die 19 is formed into a shape enabling to facilitate the compression density, thus preventing loading of the die that occurs in the general dies.

FIG. 5

Figure 5:
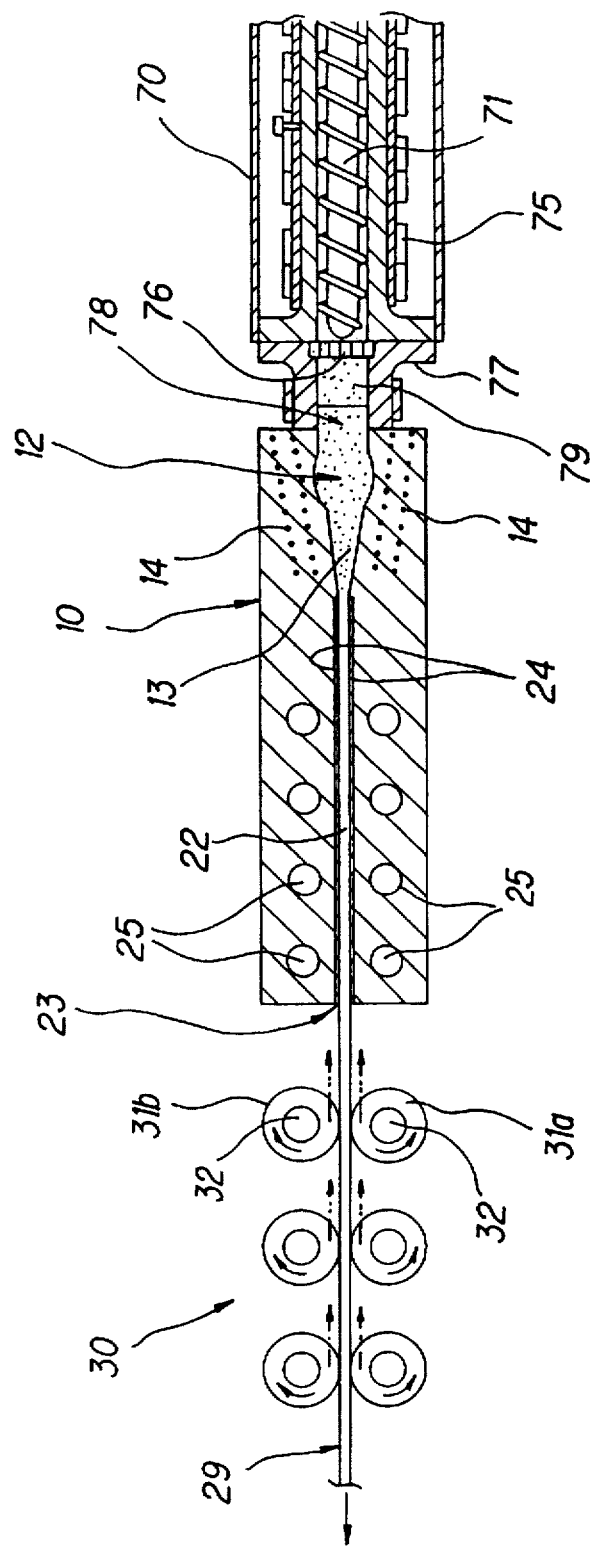
FIG. 5 is a front view showing a partially vertical section of a molding die and a braking means used in the embodiment of the present invention.

In FIG. 5, a molding die 10 is formed into a shape similar to the T-die and provided with a lead-in portion 11 in which the extruding material 79 is kept warm by heating and squeezed keeping its flowability, and a molding portion 21 including a molding chamber 22 which molds the extruding material 79 into a board having a wide width and a predetermined thickness.

The lead-in portion 11 is provided with a lead-in orifice 12 and a lead-in chamber 13 and changes its cross sectional shape rapidly from an extruding die 78, which is formed into a circular cross section having a diameter of about 65 mm, to the inlet of the molding chamber 22, which is formed into an elongated rectangular cross section having a width of 910 mm and a height of 12 mm. The distance between the extruding die 78 and the inlet of the molding chamber 22 (the distance of the lead-in portion 11 in the squeezing direction) is about 200 mm.

Figure 6:
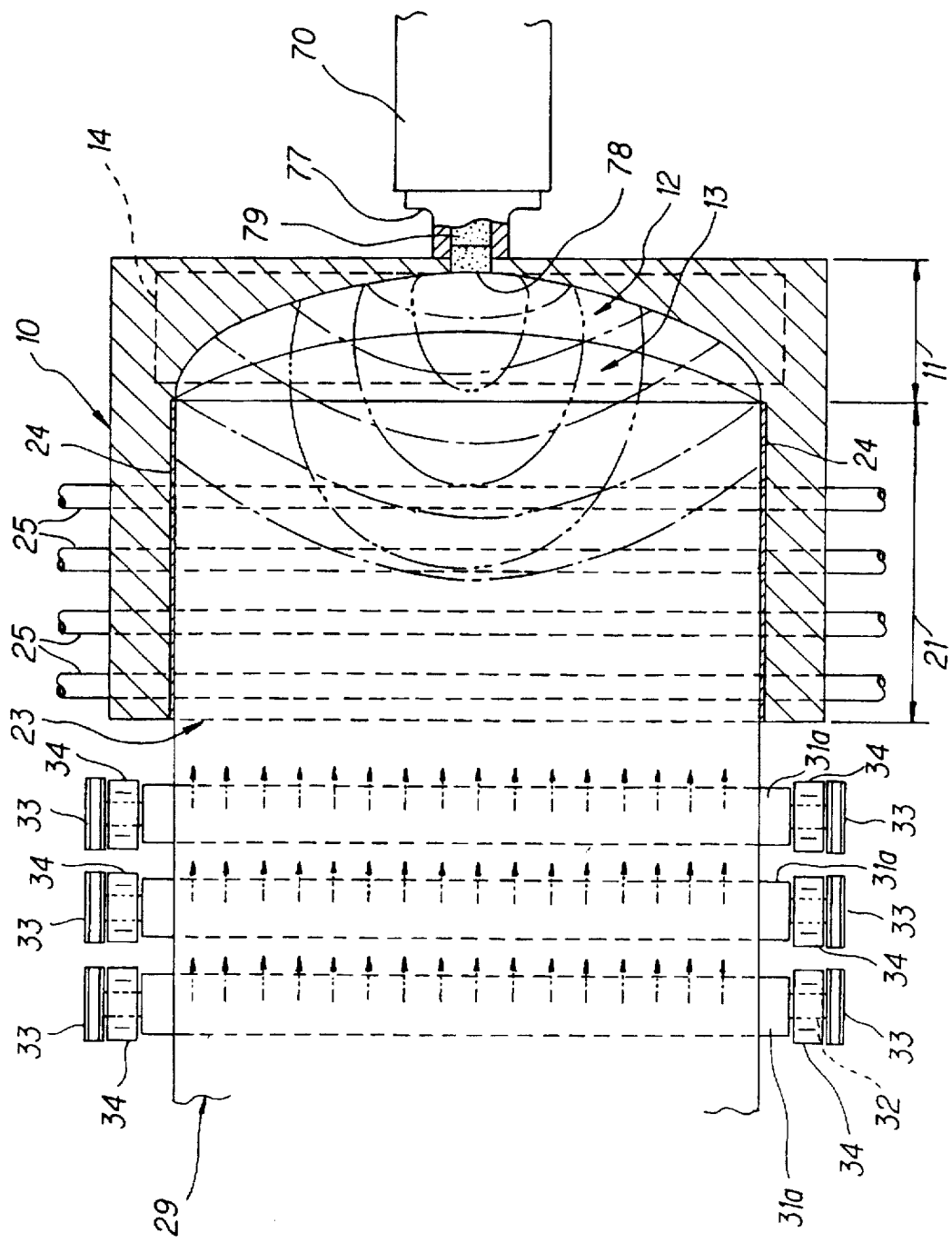
FIG. 6 is a front view showing a partly section of the molding die and the braking means used in the embodiment of the present invention.

The lead-in orifice 12 is formed inside the molding die 10 in the direction of its width by expanding the vertical cross section elliptically, as shown in FIG. 5, so as to be substantially equal to or slightly larger than the extruding die 78. The horizontal cross section of the the lead-in orifice 12 is curved toward the molding die 10 in the direction of its width, as shown in FIG. 6, in which both ends of the curved cross section reaches at the both ends of the rectangular cross section of the molding chamber 22 in the long side direction. That is, the lead-in orifice 12 is formed into a shape of coat-hanger type and is connected to the extruding die 78 of the extruder 70 substantially in the center position in the long side direction thereof. Also, the space between the lead-in orifice 12 and the inlet of the molding chamber 22 is coupled by the lead-in chamber 13 forming a triangular cross section in the direction of which the vertical cross section becomes gradually narrow.

In addition, the lead-in orifice 12 can be formed into a shape of coat-hanger type in which both ends of the rectangular cross section of the inlet of the molding chamber 22 in the long side direction are joined to the extruding die 78 of the extruder 70 in the vertical cross section by a straight line, and straight manifold type which is formed into a shape of a straight line in the direction of its width of the molding die 10. Of these, the coat-hanger type lead-in orifice having the curved cross section is especially preferable for the reason that the flowability of the extruding material running between the lead-in orifice 12 and the inside of the lead-in chamber 13 becomes high.

Further, without forming the lead-in orifice 12 and the lead-in chamber 13 by expanding the vertical cross section elliptically, the vertical cross section thereof can be formed into a triangular cross section in the direction of which the vertical cross section becomes gradually narrow from the extruding die 78 to the molding chamber, or the lead-in orifice 12 and lead-in chamber 13 can be formed by simplifying the structures in which the heights of the lead-in orifice 12 and lead-in chamber 13 are equal not only to the inside diameter of the extruding die 78 but also to the heights of the molding chamber 22 and a sheet 24. The sheet 24 is formed of fluororesin described later and lined on the molding chamber so as to form the inner wall layer.

A heater 14 is a heating means, such as an electric heater or the like, can be provided around the outside of the srounding wall of the the lead-in orifice 12 and lead-in chamber 13. However, in the embodiment, the heater 14 is provided inside the srounding wall in point of excellent heating effect so that the extruding material 79 flowing inside the lead-in orifice 12 and lead-in chamber 13 can be kept warm by heating to maintain the flowability thereof.

In addition, the molding chamber 22 is formed into a square cross section by unillustrated metal spacers that place two upper and lower sides metal plates having a heating and cooling means respectively around the edges of the both sides, so that the thickness of the synthetic wood board to be desired can be adjusted to obtain two or more kinds thereof by exchange of the spacers.

The molding die 10 is formed into an elongated rectangular shape in the vertical cross section which has a width of 910 mm and a height of 12 mm in the direction of its width and the distance between the inlet and the outlet of the molding chamber 22 (the distance of the molding portion 21 in the squeezing direction) is 500 mm.

FIG. 12

In FIG. 12, the molding die 10a is formed into the same shape as the molding die 10 described above and provided with a lead-in portion 11a in which the extruding material 79 is kept warm by heating and squeezed keeping its flowability, and a molding portion 21 similar to that of the molding die mentioned above. The lead-in portion 11a is provided with a lead-in orifice 12a of coat-hanger type and the lead-in orifice 12a changes its cross sectional shape rapidly from an extruding die 19, which is formed into a rectangular cross section having a width of 900 mm and a height of 12 mm. The lead-in orifice 12a is equivalent to that of the case the lead-in orifice 12 and the lead-in chamber 13 of the molding die 10 mentioned above is formed into the same height as the molding chamber 22.

FIGS. 5, 6 and 12

The inner wall surfaces on all sides of the molding chamber 22 is lined with a sheet 24 that is 0.25 mm thick and is formed of fluororesin. Alternatively, it is possible to directly coat the inner wall surfaces thereon with fluororesin, however it is especially preferable to line the sheet 24 of fluororesin in point of excellent durability besides easy exchange and treatment.

More preferably, the sheet 24 is formed by coating a layer of fluororesin on a surface of a glass woven fabric in which teflon TFE, teflon FEP, teflon CTFE, teflon VdF or the like is used as the flororesin as mentioned above. Also, in steadstead of the glass woven fablic, a nonwoven fablic of glass fiber may be used.

Then, although the coating processing of the fluororesin can be performed on the inner wall surfaces of the upper and lower sides, i.e., the inner wall surfaces corresponding to surfaces forming the front and back surfaces of the molded article, it is preferable to perform coating of the fluororesin on the all surfaces of the inner wall of the molding chamber 22.

Then, cooling pipes 25 shows an example of a cooling means for cooling the molding portion 11 of the molding die 10 which is installed inside the molding die 10 located in the upper and lower sides of the molding chamber 22 every proper space in the squeezing direction, which supplies cooling liquid for a cooling media, such as water under the normal temperature, water or oil in the temperature range approximately from 70° to 80° C., so as to cool the extruding material 79 squeezed through the molding chamber 22. The arrangement of the cooling pipes can be made to gradually reduce the distance between cooling pipes 25 from a part adjacent to the inlet of the molding chamber 22 toward a die outlet 23 in order to improve the slow cooling effect of the extruding material 79 squeezed from the molding chamber 22, or it can be placed in the outer wall of the molding portion of the molding die 10. However, the cooling pipes is only required to cool the extruding material 79 inside the molding chamber 22, so that the arrangement thereof is not limited to this embodiment.

FIG. 12

A guide plate 15, as shown in FIG. 12, is a plate of 7 mm thickness which is formed into a bisymmetrically trapezoidal shape having a 200 mm length of short side, a 850 mm length of long side and 100 mm height and which is lined with a sheet of 0.1 to 0.5 mm thickness formed of fluororesin, such as teflon or the like, on all outer surfaces thereof. In addition, it is possible to directly coat the outer surfaces of the guide plate 15 with fluororesin. The processes of lining the sheet of fluororesin and coating fluororesin are the same as those of the sheet 24 provided in the molding chamber 22 of the molding die 10 mentioned above. The guide plate 15 is located substantially in the center of the lead-in orifice 22 that is a height of 12 mm and a width of 90 mm so as to remain distances of 25 mm away from the both ends of the lead-in orifice 12a in the direction of its width. Simultaneously, the back end side of the guide plate 15 is located substantially to keep the parallel distance to the back end of the wall surface of the lead-in orifice 12a. The guide plate 15 is finally fastened on the molding die 10a corresponding to the lower surface of the lead-in orifice 12a with four bolts 27 as shown in FIG. 12. Accordingly, a space of 5 mm is formed between the upper surface of the guide plate 15 and the upper surface of the lead-in orifice 12a.

In addition, it is preferable to determine every size of the guide plate 15 according to the sizes of the lead-in orifice 12a such that the thickness thereof remains 90% or less of that of the lead-in orifice 12a and the width thereof remains in the range of about 70 to 95% of that of the lead-in orifice 12a.

Further, the guide plate 15 can be located substantially in the center of the lead-in orifice 12a in the direction of its height so as to form spaces on the upper and lower surfaces thereof which is similar to those of the upper and lower surfaces of the lead-in orifice 12a.

In the case that the guide plate 15 according to the embodiment is located substantially in the center of the lead-in orifice 12a in the direction of its height, it should be located substantially in the center of the lead-in orifice 12a in the direction of its height to form spaces of 2.5 mm upward and downward and fastened to the molding die 10a with four shoulder pins.

FIG. 6

The extruding material 79 squeezed from the extruding die 78 of the extruder 70 flows along the lead-in orifice 12 in the direction of the width of the molding die 10 while flowing through the lead-in chamber 13 in the squeezing direction of the molding chamber 22. In other words, the extruding material 79 flows in the direction of forming a wide ring that centers the extruding die 78 of the extruder 70 as shown by two dotted line in FIG. 6.

At this time, the lead-in portion 11 is heated by the heater 14, so that the flowability of the extruding material 79 is kept. Also, the lead-in orifice 12 and the lead-in chamber 13 are high in their height and enlarge their width rapidly, so that the extruding material 79 flowing in the lead-in orifice 12 and the lead-in chamber 13 can be squeezed keeping a proper kneaded state. Then, the extruding material 79 is extruded from the molding chamber 22 that is formed into an elongated rectangular cross section having a 910 mm length and a 12 mm height. In the process of passing through the molding chamber 22, the extruding material 79 is cooled by the cooling water flowing inside the cooling pipes 25 and solidified so as to mold a synthetic wood board as the molded article 29 that is 12 mm in thickness.

Here, in the process that the extruding material 79 flows in the molding chamber 22, the extruding material 79 is smoothly extruded cooling slowly since the surrounding surfaces of the inner wall of the molding chamber 22 are lined with the sheet 24 formed of fluororesin so as to form the inner wall layer.

The fluororesin has properties that ① the heat-resisting stands heat of 300° C., ② the surface is even and the friction coefficient is small, and ③ the coefficient of heat conduction is lower than that of metals, thereby serving the following actions with respect to the extruding material 79.

(1) Since the fluororesin makes the surface even and the friction coefficient thereof becomes extremely small, especially the wood meal can flow inside the extruding material 79 passing through the molding chamber 22 without a bad effect of large resistance thereto, thereby keeping the kneaded state of the extruding material 79 proper. As a result, a synthetic wood board of high quality of which the density is uniform without any cavities and the surface is even can be molded.

Generally, the flowability of the extruding material 79 is reduced by cooling the extruding material 79 in the molding portion 21, so that the frictional resistance of the wood meal in the extruding material 79 become larger than that of the resin material therein. Especially, in the conventional molding T-die, the frictional resistance of the inner surfaces of the molding die is also large, so that the wood meal flowing in contact with the inner surface of the molding die is subjected to a large resistance so as not to flow smoothly, thus having bad actions, such as to make the kneaded state of the extruding material 79 non-uniform and to form cavities. However, in the molding die 10 of the present invention, the inner wall layer is provided on the surfaces of the inner wall of the molding chamber 22 by lining the sheet 24 of fluororesin that forms even surfaces and has an extremely small friction coefficient, so that the wood meal of the extruding material 79 is not subjected to a large resistance from inner surfaces of the molding chamber 22, thereby having no action mentioned above and squeezing the extruding material from the molding chamber 22 keeping the density thereof uniform and high while keeping the kneaded state proper.

Also, as described above, the resisting force of the extruding material 79 against the wood meal is reduced and the extruding material 79 is formed with an uniform density, so that the surface of the synthetic wood board, being the molded article 29 as a product, can be finished evenly without generating a rough surface.

Further, in the prior art, the wood meal included in the extruding material 79 could not flow smoothly inside the molding die, so that the wood meal was burned by heating of the heater and changed the color into dark brown. On the other hand, in the present invention, as described above, the wood meal included in the extruding material 79 can flow smoothly, so that the wood meal can not be burned and the deterioration with respect to an impact resisting property and the like can be prevented.

(2) The fluororesin has a lower coefficient of heat conduction in comparison with metals, thus having a slow cooling effect to control the distortion at the time of cooling of the extruding material 79.

Although the molding chamber 22 of the molding die 10 is cooled by the cooling water flowing inside the cooling pipes 25, cooled temperature of the molding chamber 22 is not directly and rapidly conducted onto the surfaces of the inner wall since the fluororesin has a lower coefficient of heat conduction in comparison with metals, so that the extruding material 79 in the molding chamber 22 is cooled slowly without quick cooling. Accordingly, a large distortion generated in the extruding material 79 at the time of quick cooling is prevented, so that the distortion of the synthetic wood board, being the molded article 29 as a product can be reduced while making the surface even.

Furthermore, since a cooling means such as the cooling pipes 25 or the like is provided in the molding portion 21 of the molding die 10, it is not required to cool the molded article by a cooling roller or the like, or to correct the distortion thereof by a correcting roller or the like after molding in the conventional method, such as extrusion molding or calendering, thus molding a finished product of the synthetic wood board having less internal and residual stresses in the process of squeezing the extruding material 79 from the die outlet 23. Accordingly, the process of extrusion molding for the synthetic wood board according to the present invention can prevent aged warps or distortion generated in the conventional process of extrusion molding or calendering for the synthetic wood board.

Also, in the process of extrusion molding which use a molding die of T-die type, the kneaded extruding material 79 flows through the lead-in portion in which its cross sectional shape is changed rapidly from the extruding die 78 having a relatively small diameter toward the molding portion formed of an rectangular cross section having an elongated length and enlarged width, and then flows inside the molding portion along a relatively long distance, so that it has been impossible to mold a resin material mixed with a large amount of wood meal in the conventional process of extrusion molding which use the molding die of T-die type. On the other hand, as described above, by making the best use of the excellent properties of the fluororesin, the extrusion molding of the synthetic wood board including a large amount of wood meal can be realized by using the molding die of T-die type.

In the case the above-mentioned extruding die 19 is coupled to the lead-in orifice 12a of the molding die 10a, the extruding material 79 squeezed from the outlet of the screen portion 16 of the extruder 70 should be kept warm by heating and flow through the connecting orifice from the extruding die 19 into the lead-in orifice 12a of the molding die 10a. Since the connecting orifice changes its cross section only in the direction of height, the flowing state of the extruding material 79 is not complicated. Also, the height of the lead-in orifice 12a is equal to that of the molding chamber 22 and the the lead-in orifice 12a changes its cross section only in the direction of width, so that the flowing state of the extruding material 79 in the lead-in orifice 12a of the molding die 10a is not complicated in comparison with the case of the molding die 10 according to the above-mentioned embodiment in which the lead-in orifice 12 and the lead-in chamber 13 change their cross sections in the directions of both the height and the width. Accordingly, the flowing state of the extruding material 79 in the extruding die 19 and the lead-in orifice 12a of the molding die 10a becomes further proper.

Other actions are the same as those of the molding die 10 mentioned above.

FIG. 12

In the case the guide plate 15 is provided in the lead-in orifice 12a, the flow of the extruding material 79 discharged from the extruding die 19 of the adapter 17, as shown in the direction of the arrows in FIG. 12, strike the back end surface of the guide plate 15, and then, the extruding material 79 goes to both sides of the lead-in orifice 12a through a passage formed between the back edge of the guide plate 15 and the back wall surface of the lead-in orifice 12a, while some of the extruding material 79 goes toward the molding chamber 22 through a space between the guide plate 15 and the upper wall surface of the lead-in orifice 12a. Accordingly, the guide plate 15 provided in the lead-in orifice 12a permits the flow of the extruding material 79 to be relatively simple, so that the extruding material 79 is prevented non-uniform molecular orientation caused by linear expansion different between the central portion and the end portions every raw material in the squeezing direction of the extruding material 79, thus trying to make the linear expansion uniform and controlling the molecular orientation so as to uniformly diffuse the flow of the extruding material 79 into the molding chamber 22 of the molding portion 21. That is, the flow of the extruding material 79 uniformly diffuses into the molding chamber 22 of the molding portion 21 inside the molding die 11a so as to be squeezed with an uniform density, so that the extruding material 79 can be squeezed with more uniform density.

Also, since the inner wall layer is provided on the surface of the guide plate 15 by bonding the fluororesin sheet, the resisting force against the extruding material 79 passing through the guide plate 15 is reduced, and especially, the wood meal included in the extruding material 79, having a large frictional resistance, is not subjected to the large resistance on the surface of the guide plate 15 so as to flow smoothly, so that the extruding material 79 can be squeezed into the molding chamber 22 of the molding die with keeping the kneaded state of the extruding material having an uniform and high density.

Particularly, in the case the extrusion molding of the present invention is performed by using the synthetic wood meal of the present invention, since the synthetic wood meal is formed by adhering the resin on the overall surface of every wood meal, the extruding material 79 is formed in such a good kneaded state as the resin is permeated between each of the wood meal inside the extruder 70 without exception, the extruding material 79, especially the wood meal included therein is not subjected to the large resistance on the wall surface of the extruder and the molding die so as to flow flows smoothly, thereby molding a synthetic wood board that has a further uniform and high density.

Further, a braking means described in another embodiment below adds resisting force to the molded article 29, which is extruded from the die outlet 23 of the molding die, in the reverse direction to the extruding direction, thus molding a synthetic wood board that has an uniform and high density.

Figure 7:
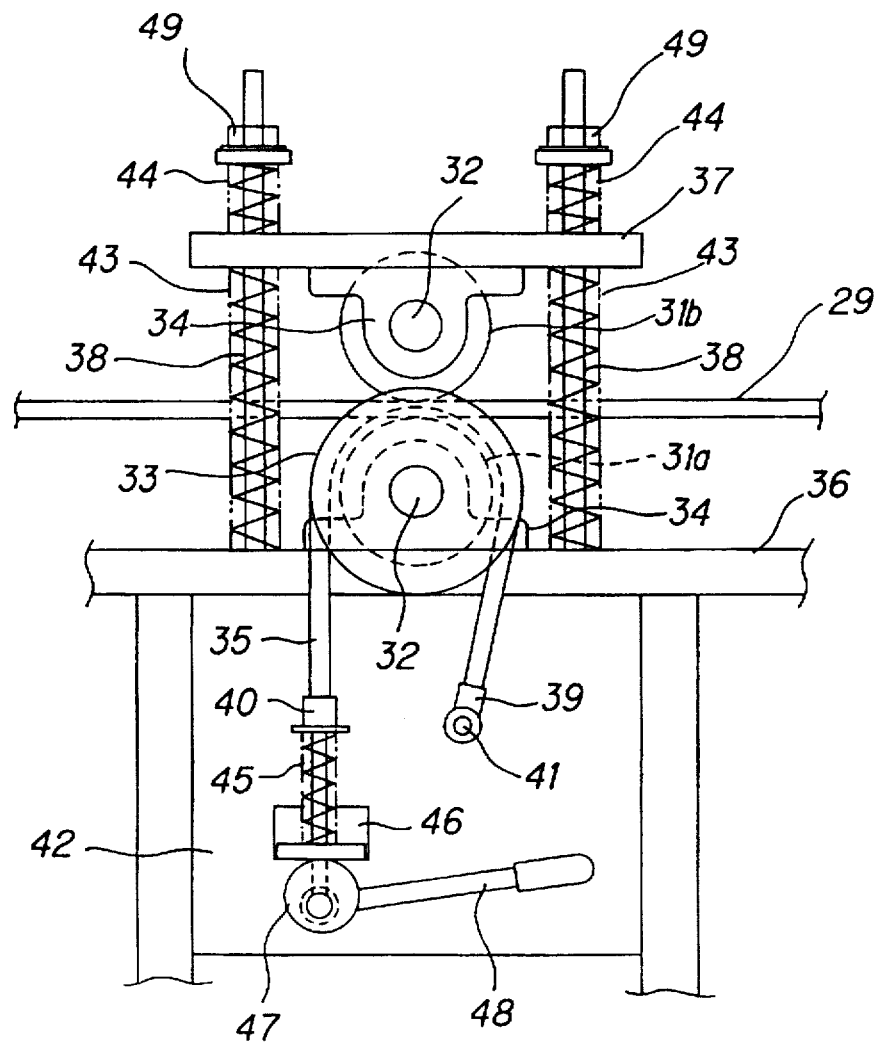
FIG. 7 is a front view showing a detail of the braking means used in the embodiment of the present invention.

FIGS. 5 through 7

As mentioned above, the braking means adds resisting force to the molded article 29, which is extruded from the die outlet 23 of the molding die 10, in the reverse direction to the extruding direction, so as to control the extruding force of the molded article 29. Hereinbelow, an embodiment of a braking means 30 will be described with reference to drawings.

In FIG. 5, pinch rollers 31a and 31b are rubber rollers contact with the molded article 29 by holding the total width on the front and back surfaces thereof with the pair of pinch rollers 31a and 31b. The respective rollers 31a and 31b are supported at the both ends of shafts 32, 32 by bearings 34, 34.

The bearings 34 located at the both ends of the roller 31a are fixed to a base 36 for fixing the bearings, two guide shafts 38, 38 are stood on the base 36 in the both sides of the bearings 34, and springs 43, 43 are respectively inserted in the guide shafts 38.

Then, the bearings 34 located at the both ends of the roller 31b are fixed to a frame 37, the frame 37 which is movable upward and downward, which is provided with a through holes at the both ends thereof and which is contacted with the springs 43 by inserting the guide shafts 38 in the through holes respectively.

In addition, the rollers 31a and 31b respectively locate their shaft centers on the line parallel to the guides 38 and the roller 31b is placed enabling to contact with and separate from the roller 31a so as to locate the molded article 29 substantially in a direction of a tangent line between the outside surfaces of the roller 31b and the roller 31a.

Here, the springs 43 are compression springs and apply power to the frame 37 in such a direction as a space is formed enabling the molded article 29 to insert between the roller 31a and 31b. Then, compression springs 44, 44 having larger strength than that of the springs 43 are inserted from the ends of the guides 38 and fastened at the ends of the guides 38 with nuts 49, 49 to press the springs 44 so as to apply power in such a direction as the frame 37, i.e., the roller 31b is pressed to contact with the roller 31a. Thus, the roller 31b is provided enabling to contact with and separate from the roller 31a. In addition, the frame 37 can be directly pressed by nuts 49 without the springs 44.

Further, drums 33 that form V-shaped grooves for putting belts 35 in the outside of the roller 31a are provided at the both ends of the roller 31a and friction members such as the belts 35 or the like are wound on the V-shaped grooves of the outsides of the drums with a half turn. Each of the belt 35 is provided with a holder 39 at one end thereof to be supported by coupling the holder 39 to a shaft 41 fixed on the side wall of the base 36, and a rod 40 with a flange at the other end thereof. Then, the end of the rod 40 is inserted into a through hole of a bracket 46 fixed on the side wall and eccentrically supports a cam provided with a lever 48.

In addition, a spring is provided between the flange of the rod 40 and bracket 46 to apply power in such a direction as the belt 35 wound on the drum 33 is loosened. Here, when the cam 47 is turned by turning the lever 48 in the counterclockwise direction of FIG. 6, the belt 35 is pulled downwardly on the paper of FIG. 6 against the power-applying force of the spring 45 through the rod 40 since the cam 47 is eccentrically supported.

That is, the belt 35 is pulled in such a direction as the the belt 35 is put in the V-shaped groove of the drum 33, so that the belt 35 is put in the V-shaped groove of the drum 33 to control the rotation of the drum 33. Also, when the cam 47 is turned by turning the lever 48 in the clockwise direction of FIG. 7, the rod 40 pushes the belt 35 upwardly on the paper of FIG. 7 by the power-applying force of the spring 45 and releases the belt 35 from the V-shaped groove of the drum 33 to remove the control of the rotation of the drum 33.

In addition, the fit of the V-shaped groove of the drum 33 and the belt 35 becomes loose or tight according to the turning stop positions of the cam 47 so as to adjust the control forces.

Instead of the cam 47, a cramping nut can be fastened at the end of the rod 40 and turned so as to adjust the fit of the V-shaped groove of the drum 33 and the belt 35, thus adjusting the control force of the rotation of the drum 33.

In the embodiment, although three the above-mentioned pair of rollers 31a and 31b are provided at proper spaces in the extruding direction of the molded article 29, as shown in FIGS. 5 and 6, the present invention is not limited to this number and it is possible to use any number of pairs as far as it can function.

Also, in the embodiment, although the above-mentioned braking means are provided at the both ends of the roller 31a, it is possible to provide it at one end of the roller 31a. However, in consideration of completely controlling the rotation of the roller 31a, it is preferable to provide the braking means at the both ends of the roller 31a.

Also, in another embodiment of the braking means, a pair of brake disks having a length that is extended on the total width of the molded article 29 is provided enabling to contact with and separate from the front and back surfaces of the molded article 29, so that the extruding force of the molded article 29 can be controlled by pressing to contact with the front and back surfaces by the pair of brake disks. Further, the brake disks can be formed by fixing plate-shaped elastic members formed of rubber or resin to frames made of steel or wood so as to press the surfaces of the elastic members to contact with the molded article 29. In addition, the braking means consisting of the pair of brake disks is not limited to the number to be used.

Effect of Extrusion Control of Molded Articles

The nuts 49, 49 are fastened against the power-applying force of the springs 43, 43, the frame 37 is pushed downwardly on the paper of FIG. 7 through the springs 44, 44, and the roller 31b is pressed to contact with the roller 31a through the molded article 29. The rollers 31a and 31b are turned in the direction of the arrows shown in FIG. 5 by the extruding force of the molded article 29, and then, the drum 33 is turned together with the rotation of the roller 31a.

The cam 47 is turned by turning the lever 48 in the counterclockwise direction of FIG. 7, the belt 35 is pulled downwardly on the paper of FIG. 7 against the power-applying force of the spring 45 through the rod 40 and the rotating force of the drum 33 is controlled, so that the molded article 29 squeezed from the die outlet 23 of the molding die 10 is inserts between the rollers 31a and 31b, thereby controlling the extruding force of the molded article 29 held between the rollers 31a and 31b.

As shown in FIGS. 5 and 6 with the arrows of two-dot chain lines, the control force against the extruding force of the molded article 29 is generated from the rollers 31a and 31b, which applies the force to the extruding material 79 in the molding portion 21 of the molding die 10 and the lead-in portion 11 in the reverse direction to the extruding direction. At this time, the extruding material 79 is in such a state as it has high flowability before cooling, so that the extruding material 79 discharged from the extruding die 78, as shown in FIG. 6 with one-dot chain lines, is extruded by the control force in such a state as extended in the direction of width of the molding die 10 rather than the extruding direction and further, in such a state as made the density of the wood meal extremely high.

In the case the control force is not applied to the molded article 29 molded by the process of extrusion molding of the present invention mentioned above, the rate of the extruding material 79 flowing in the extruding direction becomes large as shown in FIG. 6 with two-dot chain lines. Thus, when comparing the case of applying the control force to the molded article 29 with the case of not applying the control force to the molded article 29, it is apparent that both of the extruding materials 79 are remarkably different in the flowing states from each other.

The process of molding the synthetic wood board in the case the control force is applied to the molded article 29 can make the density of the wood meal further higher in the extruding material 79 in comparison with the process of molding the synthetic wood board in the case the control force is not applied to the molded article 29, thereby molding a synthetic wood board that is the molded article 29 for a product having further more uniform and higher density across the total region in the direction of width of the molding die 10. In addition, the extruding speed in the case the control force is applied to the molded article 29 is from 4 to 5 m per hour.

Accordingly, although it has been difficult in the prior art to extrude the extruding material 79 from the extruding die 78 having a relatively small diameter into the molding die 10, which changes its cross sectional shape rapidly toward the molding chamber 22 formed of a rectangular cross section having an elongated length and an enlarged width, with keeping the uniform and high density in the kneaded state, in the process of extrusion molding for the synthetic wood board according to the present invention, it is possible to mold a synthetic wood board having further more uniform and higher density by the processes not only in the case the control force is applied to the molded article 29, even in the case the control force is not applied to the molded article 29.

FIGS. 13 and 14

Another embodiment of the braking means will be described below. Here, the same members as those of the braking means according to the above-mentioned embodiment use the same reference numerals.

In FIGS. 13 and 14, bearings 34a for supporting the both ends of the shafts of the three rollers 31b are respectively fixed to the base 36, the rollers 31a are moved in connection with gears 116, being provided in the respective shafts, and gears 117, being engaged with the gears 116, and an input shaft of a powder brake 115 is connected to a shaft corresponding to one of three rollers 31a. The powder brake 115 is a kind of electromagnetic brake to electrically and finely adjust friction torque.

Also, frames 114 are stood on the base 36, two block-shaped guide members 119 with guide grooves therein are respectively provided on the wall surfaces of the respective frames 114 to direct the center shafts of the guide members 119 in the up and down direction substantially parallel to each other, bearings 34b for supporting the both ends of the respective three rollers 31b are provided to be movable upwardly and downwardly along the guide grooves of the guide members 119, and the bearings 34b are respectively connected to ends of rods of three air cylinders 118 provided on the upper surface of the frames 114.

Accordingly, the rollers 31b are respectively pressed against the rollers 31a through the molded article 29, the rotation of a shaft corresponding to one of three rollers 31a is controlled by the powder brake 115, a gear 116, which is provided in the shaft of the corresponding roller 31a controlled by the powder brake 115, is engaged with the other gears 116, 116, which are provided in the other shafts corresponding to the other rollers 31a, 31a, through the gears 117, 117, so that the same rotation-control force generated by the friction torque of the powder brake 115 is applied to the three rollers 31a.

Here, the pressure of the cylinder 118 applying each of the rollers 31a is adjusted according to the thickness of the molded article 29 to be desired. Similarly, the friction torque for controlling the rotation of the roller 31a by the powder brake 115 is also adjusted according to the thickness of the molded article 29 to be desired.

For example, in the embodiment:

In case of the molded article 29 of 12 mm thickness;
the air pressure of the cylinder 118 is from 5 to 4 kg/cm$^2$, the load applied from one of the rollers 31b to the corresponding roller 31a through the molded article 29 is about 1,000 kg. Accordingly, load of 3,000 kg is placed on the molded article 29 in total of three rollers 3b.

In addition, the friction torque of the powder brake 115 is 10 kg/m.

In case of the molded article 29 of 30 mm thickness;
the air pressure of the cylinder 118 is from 8 to 10 kg/cm$^2$, the load applied from one of the rollers 31b to the corresponding roller 31a is about 2,000 kg. Accordingly, load of 6,000 kg is placed on the molded article 29 in total of three rollers 3b.

In addition, the friction torque of the powder brake 115 is 20 kg/m.

Accordingly, the friction torque of the powder brake 115 applies the control force against the extruding force of the molded article 29, so that the extruding material 79 in the molding die 10 and molding portion 11 of the molding die 10a can be turned in a further uniform and dense state. Then, the uniform and dense extruding material 79 proceeds by the extruding force thereof generated by the extruder 70 against the control force of the braking means and is cooled inside the molding chamber 22 so as to mold the molded article 29. The molded article 29 proceeds against the control force of the powder brake 115 to rotate the rollers 31a and 31b.

As described above, the braking means 30a according to the embodiment can easily adjust the pressure applied by the cylinders 118 through the rollers 31b according to the thickness of the molded article to be desired. In addition to the braking means 30a, the embodiment can easily adjust the control force of the rollers 31a by using the powder brake 115, so that it can be considered that the braking means according to this embodiment is more preferable in comparison with the braking means 30 according to the former embodiment.

After that, the synthetic wood board that is the molded article 29 for the product to be desired is cut into a desired length by a cutting machine, such as a cutter, a shearing machine or a sawing machine, in case of thin molded article 29, a cutting machine, such as a cutter or the like, is used. In case of such a thick molded article 29 as 12 mm thickness or the like, a cutting machine, such as a shearing machine or a sawing machine, is used.

FIG. 8 (B) shows still another embodiment of the present invention with the intention of improvement of the production capacity, in which molding dies 10, 10 substantially same as that shown in FIG. 8 (A) are coupled to the extruding die 78 connected with the extruder 70.

First Example for Manufacturing Synthetic Wood Meal

In this example, the raw material of 55 wt % includes 30 kg of wood meal of which the mean particle diameter is 20 mesh or less and the bulk specific density is 0.2 (containing 8 wt % of water), 0.3 kg of urea solution having a concentration of 40% which is constituted from ammonia, phenol or melamine and which is a counteragent for wood vinegar gas (the rate of urea to wood meal being 1 wt %), and 3 kg of calcium carbonate. The others of 45 wt % includes 27 kg of PP (polypropylene) as the resin material.

In addition, the mean particle diameter of the wood meal indicates the particle diameter of 50 wt % of the wood meal in the cumulative weight percent distribution.

The process of kneading by use of the above-mentioned mixer 80 will be described below.

(1) The stirring and impact-applying blades 85, 86 and 87, and the scraper 84 are rotated by the motor at high speed, 30 kg of wood meal is fed from the feeding port 94 after opening the upper cover 82 and 0.3 kg of urea is added thereto little by little.

(2) After about 1 minute, 3 kg of calcium carbonate corresponding to the calcium carbonate amount of 5 to 10 wt % is added and kneaded for about 10 to 20 minutes. When the calcium carbonate and titanium oxide are added, the specific weight of the raw material becomes heavy, so that the stirring and impact-applying blades make the shearing force high by rotating at a high speed, thus improving generation of frictional heat by the shearing force. As a result, the inside of the mixer 80 is dried at a temperature 180° to 190° C. so as to reduce the moisture content of the raw material to 1 wt % or less, and preferably, 0.3 wt % or less. Incidentally, in the embodiment, the temperature in the mixer body 81 was 190° C. and the moisture content was 1 wt % after 17 minutes and nine seconds from feeding the wood meal. In addition, the wood meal is crushed by rotating the stirring and impact-applying blades 85, 86 and 87 at a high speed and large amounts of steam and wood vinegar gas are discharged from the gas exhaust pipe 95 provided on the upper cover 82.

(3) Next, 25 kg of PP (polypropylene) as the resin material is fed inside the mixer body 81 and kneaded for about 5 to 8 minutes (8 minutes in this embodiment). Here, the resin material of the embodiment used pellets that lie in the particle diameter of about 3 mm.

In addition, the melting point of the PP resin material was 165° C. and the temperature in the mixer body 81 was 186° C. in this process.

Accordingly, the wood meal included in the raw material did not generate a large lump of the resin material and coagulate in the process of mixing and dispersing, so that the mixing material set to gel, i.e., at the threshold of solidifying, like clay, thus forming a lump-shaped "kneaded material" that lie in the granule diameter of about 10 to 100 mm. That is, the lump is formed by adhering the thermoplastic resin material to the overall surface of a wood meal granule that is constituted from single species of the wood meal and gathering the wood meal granules to make a mass of group, so that the relationship between the wood meal granules does not have any adhesion and the lump is quite brittle. Therefore, the kneaded material formed in this process is a proper material which can be kneaded further effectively in the extruder 70 of the after-process described later and which can particularly reduce the frictional resistance of the wood meal in the process of extrusion molding.

Further, in case of this example that uses PP for the resin material, if the amount of the wood meal becomes 35 wt % or less of the total amount of the raw material, the resin material is formed into large lumps, so that the amount of the wood meal should be 35 wt % or more. The wood meal of 75% or less by weight can set the raw material to gel, however, if more than 75 wt %, the wood meal is caused to burn so that it is not proper to use.

(4) The motor is turned at a low speed, the cover 89 is set back by the operation of cylinder 91 so as to release the exhaust port 88. The raw material set to gel inside the mixer body 81 is discharged from the exhaust port 88 through the exhaust duct 93 and fed into the next process. Incidentally, the temperature at the time when discharging was 186° C. and the full process to be treated took 25 minutes and 54 seconds from feeding the raw material up to discharging the forming material.

In addition, if the motor is turned at a low speed and the temperature in the mixer body 81 is reduced to 10° C. higher than that of the melting point of the resin material included in the raw material, the kneaded material in the mixer 80 is cooled and granulated into a large-size granule that lies in the granule diameter of about 25 mm or less so as to form a granulated wood meal. In this case, the processing in the cooling granulation means of the next-process can be omitted, while the synthetic wood meal can be formed by regulating the above-mentioned granulated wood meal to a size that lies in the particle diameter of 10 mm or less in the size regulation means of the after-process.

Second Example for Manufacturing Wood Meal

In this example, the raw material of 64 wt % includes 26 kg of wood meal of which the mean particle diameter is 20 mesh or less and the bulking density is 0.2, 0.3 kg of urea solution having a concentration of 40%, and 3 kg of titanium oxide than is 5 to 20 wt %. The others of 36 wt % includes 16 kg of PC (polycarbonate) as the resin material.

If the raw material is kneaded in the mixer 80 mentioned above, the same processes as those of the former embodiment can be adopted. Incidentally, The temperature in the mixer body 81 was 159° C. after 17 minutes and 30 seconds from feeding the wood meal, while the kneaded material set to gel was discharged at temperature 223° C. after 26 minutes and 14 seconds from feeding the PC.

(5) Cooling Granulation

The kneaded material formed in the mixer 80 mentioned above is fed via the exhaust duct 93 from the feeding port 113 of the cooling mixer 100 into the mixer body 101. The stirring and crushing blade 104 is rotated by the motor 105 at the rotational speed of 90 rpm, while the arm 103 is rotated in the horizontal direction at the rotational speed of 3 rpm.

The kneaded material is cooled on the inner wall surface of the cooling mixer body 101 by the cooling water flowing inside the jacket 102 so as to form the "granulated wood meal" by granulating its diameter to 25 mm or less. Then, the granulated wood meal is discharged from the exhaust port 107 by releasing the valve 106.

In addition, the melting point of the PP resin material was 165° C. and the the kneaded material was cooled at a temperature 90° to 100° C. after 10 to 15 minutes from feeding the kneaded material set to gel in the mixer 80 at temperature 180° C. described above, thus effectively performing the cooling granulation in the cooling mixer according to the second example. As to the cooling water flowing inside the jacket 102, the temperature thereof supplied from the feed water pipe 108 was 30° C., while the temperature thereof drained from the drain pipe 109 was 40° C.

(6) Size Regulation

The granulated wood meal formed by the cooling granulation means is regulated to a size that lies in a particle diameter of 10 mm or less by using the cutter mill so as to form "synthetic wood meal".

The granulated wood meal is regulated to the size that lies in the diameter of 0.1 to 8 mm, between rotary blades 125 provided in the cutter supporting body 124 and the fixed blades 126 so as to form the "synthetic wood meal". Then, the synthetic wood meal passes through the mesh of the screen 129 provided in the size regulating chamber 128 so as to be discharged from the exhaust port 131.

Comparative Example of Synthetic Wood Board Using Synthetic Wood Meal

Various tests of physical properties is performed with respect to the following boards:

a synthetic wood board manufactured by manufacturing machine shown in FIGS. 4 and 11 to 14 using the synthetic wood meal formed in the above-mentioned second example of the present invention, which is constituted from the wood meal of 50% and the resin material of 50% (12.0 mm thickness) (hereinafter, called "Example A");

a plywood A combining three layers of wood boards (11.2 mm thickness);

a plywood B combining five layers of wood boards (11.6 mm thickness); and a plywood C combining seven layers of wood boards (15.3 mm thickness).

(1) Flexural Modulus and Flexural Strength Test

Test condition

Distance of supporting points; 100 mm

Test speed; 5 mm/min

TABLE 1

Flexural Modulus And Flexural Strength Test

| Sample | Vertical Direction | | Horizontal Direction | |
|---|---|---|---|---|
| | Flexural Modulus (GPa) | Flexural Strength (MPa) | Flexural Modulus (GPa) | Flexural Strength (MPa) |
| Example A | 2.73 | 27.5 | 2.51 | 28.2 |
| Plywood A | 5.04 | 68.9 | 3.73 | 59.8 |
| Plywood B | 4.79 | 50.6 | 4.67 | 48.5 |
| Plywood C | 1.98 | 29.1 | 1.64 | 27.5 |

( ); Unit

As mentioned above, in the case the flexural modulus and the flexural strength of Example A in the vertical direction and the horizontal direction are compared with those of Plywood A and Plywood B, the Example A shows lower values than those of the Plywood A and the Plywood B.

On the other hand, in case of comparison with Plywood C, the Example A shows a relatively close value on the flexural strength in the vertical direction. With respect to the flexural modulus in the vertical direction and the horizontal direction and the flexural strength in the horizontal direction, the Example A shows higher values than those of the Plywood C.

Accordingly, it can be obtained such a proper result as the synthetic wood board according to the present invention shows the flexural modulus and the flexural strength equivalent to those of a certain plywood.

(2) Surface Impact Test

Test condition; 10 m/sec

TABLE 2

Surface Impact Test

| Sample | Impact Value (J) |
|---|---|
| Example A | 62.2 |
| Plywood A | 22.1 |
| Plywood B | 42.5 |
| Plywood C | 54.9 |

( ); Unit

As mentioned above, the surface impact value of the Example A according to the present invention shows higher value than those of any comparative Plywoods.

(3) Rockwell Hardness Test

Test condition

Pressure Element; Steel Ball of 12.700 mm Diameter

Test Load; 60 kgf

TABLE 3

Rockwell Hardness Test

| Sample | Rockwell Hardness (HRR) |
|---|---|
| Example A | 137 |
| Plywood A | 98 |
| Plywood B | 71 |
| Plywood C | 41 |

( ); Unit

As mentioned above, the rockwell hardness value of the Example A according to the present invention shows higher value than those of the other comparative Plywoods. The synthetic wood board of the present invention has such an excellent hardness as about 1.4 times that of the Plywood A, about 1.93 times that of the Plywood B and about 3.4 times that of the Plywood C.

(4) Moisture Content Test

Test condition

Each test piece is dipped into demineralized water and measures the mass change (moisture content) after leaving it at 25° C. for 24 hours.

TABLE 4

Moisture Content Test

| Sample | Before Test (g) | After Test (g) | Moisture Content (%) |
|---|---|---|---|
| Example A | 27.154 | 27.186 | 0.1 |
| Plywood A | 16.117 | 18.575 | 15.3 |
| Plywood B | 17.419 | 20.828 | 19.6 |
| Plywood C | 15.468 | 20.925 | 35.3 |

( ); Unit

As mentioned above, the moisture content of the Example A shows an extremely lower value than those of the other comparative Plywoods. As a change of the moisture content becomes larger, the change rate of the expansion and shrinking of the board becomes larger, i.e., the size change of the board becomes larger in accordance with the environmental changes, such as humidity and the like, thereby easily occurring cracks of the board or size errors.

The synthetic wood board according to the present invention shows an extremely lower moisture content as high as $1/153$ to that of the Plywood A that is the lowest moisture content of the three Plywoods mentioned above, so that the size stability becomes extremely high irrespective of the environmental changes, such as humidity and the like.

(5) Nail Drawing Strength Test

Test condition

Test speed; 5 mm/min

TABLE 5

Nail Pull-Out Strength Test

| Sample | Pull-Out Strength (KN) |
|---|---|
| Example A | 0.18 |
| Plywood A | 0.33 |

TABLE 5-continued

Nail Pull-Out Strength Test

| Sample | Pull-Out Strength (KN) |
|---|---|
| Plywood B | 0.41 |
| Plywood C | 0.25 |

( ); Unit

As mentioned above, the nail pull-out strength of the Example A according to the present invention shows the lowest value of all samples. Generally, it is a weak point common to all kinds of plywoods that the nail pull-out strength is low. It is considered that frictional force of the wood tissue around the nail appears to be the nail pull-out strength when pulling out the nail. Since the synthetic wood board includes a resin having a low frictional resistance, which effects to reduce the nail pull-out strength, so that it can be estimated that the nail pull-out strength of the synthetic wood board according to the present invention shows a lower value than those of the other comparative Plywoods that are constituted from wood boards having a large frictional resistance. However, the Example A can obtain such a proper result as it has about 72% of the nail pull-out to that of the Plywood C.

In case of the synthetic wood board, the nail pull-out strength thereof can be made higher by enhancing the density between the respective wood meal elements. The Example A has a high density, thereby obtaining the proper result described above.

(6) Wood Screw Test

Test condition

Test speed; 5 mm/min

TABLE 6

Wood Screw Test

| Sample | Pull-Out Strength (KN) | Scratch Strength (KN) Vertical Direction | Scratch Strength (KN) Horizontal Direction |
|---|---|---|---|
| Example A | 2.48 | 2.53 | 2.04 |
| Plywood A | 1.26 | 1.58 | 1.61 |
| Plywood B | 1.47 | 1.78 | 1.77 |
| Plywood C | 1.29 | 1.41 | 1.46 |

( ); Unit

As mentioned above, the wood screw pull-out strength of the Example A according to the present invention shows the highest value of all samples. Also, the wood screw scratch strength in the vertical direction and the horizontal direction are higher values than those of the Plywood A, B and C.

It is considered that the wood screw pull-out strength is concerned with shearing force of the wood tissue around the wood screw different from the frictional force of the wood tissue around the nail in case of the nail pull-out strength. That is, in case of the synthetic wood board, it is considered that the adhesion between the wood tissue biting into the wood screw and other tissue reflects the wood screw pull-out strength.

In case of the synthetic wood board according to the present invention, since the wood meal included in the synthetic wood board has an uniform and high density, the adhesion between the respective wood meal elements is strong, so that it can be obtained such a proper result as the wood screw pull-out strength and the wood screw scratch strength of the Example A are higher than those of the other comparative plywoods.

As apparent from the results of the respective tests, the synthetic wood board of the present invention shows proper characteristics which is close to a certain plywood in the flexural modulus, the flexural strength and the nail pull-out strength, and which is more excellent in the surface impact, the moisture content, the wood screw pull-out strength and the wood screw scratch strength than those of different kinds of plywoods.

Example for Manufacturing Coating Material

A solution is prepared by combining 60 parts by weight of a solvent containing dimethylformamide and methylethyl ketone at the ratio 1:1 and 20 parts by weight of urethane resin. The solid content of urethane resin in the solution and the synthetic wood meal of the present invention are mixed at the ratio of 1:1 and kneaded in a ball mill for about 10 minutes to obtain an coating material. The resultant coating material shows a preferable dispersing property to the solvent and solution as a paint material and a coating material by the proper flowability and the mixture dispersing property of the synthetic wood meal, thus not dispersing in the coating material.

Example for Manufacturing Other Synthetic Wood Board

Using the apparatus shown in FIGS. 4 to 7, the following raw materials are fed into the extruder and kneaded by heating. The kneading material is heated in the lead-in portion of the molding die and squeezed by the screw into the molding portion of the molding die in which the fluororesin sheet is bonded on the inner wall surface thereof. Then, the material is cooled slowly in the molding portion and extruded to be a molded board, while holding the front and back surfaces of the molded board so as to be pressed by pairs of rollers and applying a control force against the squeezing force of the molded board by a drum provided at the end of shafts of the rollers.

TABLE 7

| First Example of Other Synthtic Wood Board | |
|---|---|
| Extruder | Diameter 65 mm Single Screw Extruder |
| Clearance | 0.2 mm (Between Screw 71 and Barrel 74) |
| Molding Die 10 | Width 910 mm Height 12 mm (Vertical Cross Section of the Width Direction) |
| Length of Molding Die | 500 mm (Between Inlet of Molding Chamber and Die Outlet) |
| Discharge Amount | 80 kg/hour |
| Resin Material | PET |
| Cellulose Crushed Material (Wood Meal) | Mixing Ratio: 51 wt % Particle Diameter: 80 mesh Moisture Content: 5 wt % Stabilizer: Calcium Carbonate |
| Capacity of Production | About 5 m/hour |

A synthetic wood board, which is the molded article 29 for the product mentioned above and which is 910 mm in width and 12 mm in height, is cut by a sawing machine every 1820 mm so as to be used for a concrete panel having beige color and a weight of 18 kg. The synthetic wood board of about 10 to 12 mm thickness is also used for furniture materials, such as a desk, a table or a dishboard.

In addition, in case the height of the molding die 10 is set to 20 to 30 mm, the synthetic wood board of 20 to 30 mm thickness is molded so as to be used for a chopping board or other uses. Accordingly, the thickness of the molded synthetic wood board is not limited to the above-mentioned example.

TABLE 8

Second Example of Other Synthtic Wood Board
(Process and apparatus for manufacturing the second example
are the same as those of the first example)

| | |
|---|---|
| Extruder | Diameter 65 mm Single Screw Extruder |
| Clearance | 0.2 mm (Between Screw 71 and Barrel 74) |
| Molding Die 10 | Width 910 mm Height 3 mm (Vertical Cross Section of the Width Direction) |
| Length of Molding Die | 500 mm (Between Inlet of Molding Chamber and Die Outlet) |
| Discharge Amount | 45 kg/hour |
| Resin Material | PVC |
| Cellulose Crushed Material (Wood Meal) | Mixing Ratio: 45 wt %<br>Particle Diameter: 150 mesh<br>Moisture Content: 4 wt %<br>Stabilizer: Urea resin 10 wt % |
| Capacity of Production | 20 m or more/hour |

A synthetic wood board, which is the molded article 29 for the product mentioned above and which is 910 mm in width and 3 mm in height, is cut by a shearing every 1820 mm so as to obtain the synthetic wood board having a weight of 4.5 kg.

The synthetic wood board as a thin board is used for various uses, such as every kind of building material, a furniture materials, or equipment parts. For example, the thin synthetic wood board is used for building materials, such as a decorative laminated sheet for the interior parts of a house or the like, or for floor materials, such as a flooring block which is cut into square of 300 mm each, or the like. The thin synthetic wood board is also used for interior materials of a car, for example, decorative laminated sheets around an instrument panel and a transmission, or on the inside wall of the car, so as to make the car delux. As to the equipment parts, this board is used for box panels of an electric equipment etc. or decorative laminated sheets of other equipments.

As described above, according to the extrusion molding of the present invention, various synthetic wood boards can be molded over a wide range of thickness, from a thin board to a thick board, so as to fit for various uses.

The synthetic wood board molded by the process of extrusion molding of the present invention has a high density so as to mix a large amount of wood meal therein. Since the wood meal is obtained at a half price of thermoplastic resin or less so that the synthetic wood board can be molded at a low cost. Also, the synthetic wood board mixed a large amount of wood meal has excellent properties similar to those of a natural wood panel.

The synthetic wood board of the present invention can be also molded by using a hot press molding so as to be repressed by heating and disconnected from a mold by cooling. However, in the synthetic wood board molded by the process of extrusion molding of the present invention, the internal and residual stresses are low in comparison with that molded by a conventional calendering or a conventional extrusion molding, so that the distortion of the board does not occur beyond expectation.

The synthetic wood meal of the present invention is constituted from powder of a cellulose crushed material than lies in the mean particle diameter of 20 mesh or less for good fitting to the resin material so as to make to adhere the resin material onto the overall surface of the cellulose crushed material without coagulation thereof in the process of gelation kneading and the process of mixing dispersion, so that a synthetic wood meal having proper flowability is formed, which enables to steadily keep a resin material fixed to the thermally and chemically stable wood meal for steadily keeping the mixing and dispersing states between the wood meal and the resin material, and which does not depend upon chemical reaction or adhesion following condensing action by cooling and reducing action.

By using such a synthetic wood meal, an extruding material, being in a proper kneading state, is formed in the extruder so as to reduce the frictional resistance of the cellulose crushed material in the process of extruding, thereby preventing the extruder from the wear and the damage, and molding a synthetic wood board having an uniform and high density. In the prior art, a fine powder of the cellulose crushed material that lies in the particle diameter of 80 to 300 mesh has been used, while the present invention could provide the synthetic wood meal enabling to use cellulose crushed materials having extensive particle size that lies in the mean particle diameter of 20 mesh or less.

Further, the synthetic wood meal of the present invention makes the moisture content of the cellulose crushed material maintain within 15 wt %, so that wood vinegar gas can be vaporized and generation of steam or bubbles can be reduced in the process of gelation kneading and the the process of forming, thus preventing rough surface of the molded article.

Furthermore, the synthetic wood meal of the present invention is regulated to a size that lies in the particle diameter of 10 mm or less, thereby preventing the wood meal from a burn, and also preventing the extruder from the wear and the damage by reducing the frictional resistance of the wood meal.

The process for manufacturing the synthetic wood meal of the present invention can form the above-mentioned synthetic wood meal in which the resin material adheres onto the overall surface of the cellulose crushed material without coagulation of the mixture to be kneaded so as to be set to gel in a state of relatively small granules.

The synthetic wood board using such a synthetic wood meal according to the process of the present invention is molded into a synthetic wood board having an uniform and high density, in which the extruding material kneaded by heating is squeezed into the molding die in such a properly kneaded state as the resin material uniformly permeates between each of the cellulose crushed granules and in such a state as the frictional resistance of the cellulose crushed material is reduced, while a control force against the squeezing force of the extruding material is applied.

Further, the synthetic wood board of the present invention is extruded with a predetermined thickness in which the cellulose crushed material of 20 to 75 wt % is mixed in the resin material and kneaded by heating, the kneading material is squeezed by the screw into the molding portion of the molding die. Then, the extruding material is slowly cooled in the molding portion of the molding die. Here, the molding portion includes the inner wall layer which is formed by lining with a fluororesin sheet on the inner surface thereof or by directly coating the fluororesin thereon. Since the fluororesin has a low coefficient of thermal conduction so as to contribute to slow cooling, the distortion of the molded article generated in the process of cooling the extruding material can be reduced. Accordingly, a synthetic wood board of high quality can be molded, which reduces the internal and residual stresses thereof so as not to be required to alter the distortion of the molded article by using a correcting roller or the like.

Since the fluororesin has a low coefficient of thermal conduction, resisting force against the cellulose crushed material included in the extruding material can be reduced, so that the extruding material can flow in a properly kneaded state of the cellulose crushed material and the resin material. Accordingly, a wide and uniform synthetic wood board of high quality can be directly molded by squeezing the extruding material from the molding die in a properly kneaded state. For this reason, a thick synthetic wood board can be extruded directly from the molding die.

Also, since the cellulose crushed material flows properly, the cellulose crushed material can not be burned by the heater provided in the molding die, while the conventional cellulose crushed material slowly flowed so as to be burned by the heater. Accordingly, the molded synthetic wood board can not change color into dark brown and avoid the deterioration of the impact resisting property or the like, which is different from the conventional board.

Since the frictional resistance of the fluororesin is low, the cellulose crushed material and the resin material can flow in a properly kneaded state, so that the synthetic wood board that is a molded article for a product can be molded so as to have a even surface without occurring rough surface thereon.

Since the control force against the squeezing force of the extruding material is applied to the molded article squeezed from the molding die so as to increase the density of the extruding material located in the molding portion of the molding die, a synthetic wood board can be extruded so as to have more uniform and higher density therein.

Since the extruding material is heated in the lead-in portion of the molding die and squeezed into the molding portion of the molding die, the extruding material can be smoothly squeezed into the molding portion of the molding die so as to maintain the flowability thereof, i.e., to keep the kneaded state proper.

The present invention provides an extruder for molding the above-mentioned wide synthetic wood board of high quality that has an uniform and high density therein and an even surface thereon.

In the extruder of the present invention, a guide plate is provided in the lead-in portion of the molding die, which has a length of 70 to 95% to the whole length of the lead-in portion in the direction of width and a height of 70% or less to the height of the lead-in portion so as to uniformly diffuse the extruding material by the guide plate from the lead-in portion into the molding chamber of the molding portion, so that the extruding material 79 is prevented non-uniform molecular orientation caused by linear expansion different between the central portion and the end portions every raw material in the squeezing direction, thus trying to make the linear expansion uniform and controlling the molecular orientation so as to uniformly diffuse and squeeze the extruding material 79 into the molding chamber 22 of the molding portion 21 with a uniform density.

Further, an inner wall layer is provided on the surface of the guide plate by lining with a fluororesin sheet or by directly coating fluororesin, so that the cellulose crushed material included in the extruding material passing through the surface of the guide plate can flow smoothly without being subjected to large resistance, thus molding the synthetic wood board having an uniform and high density.

By using the extrusion molding for the synthetic wood board mentioned above, the present invention provides various materials or articles which can be used for various uses, for example, resin materials for mixing in paints or coating materials, concrete panels or floor materials (flooring blocks), every kind of building materials such as decorative laminated sheets for the interior wall or the like, furniture materials, every kind of equipment parts such as box panels for electric equipments, or interior and exterior materials for every kind of car such as decorative laminated sheets for the interior of cars.

Furthermore, by using the extrusion molding of the present invention, a synthetic wood board having a higher density can be molded, so that a large amount of the wood meal can be mixed in per unit weight, thereby molding the synthetic wood boards of high quality at low cost.

The molding die of the above-mentioned extruder forms a injection port into a square shape having a height equal or less to that of the molding chamber in the molding portion of the molding die so as to change its cross section gradually narrow toward the injection port, so that a large amount of melted synthetic wood meal can be discharged, thus improving the pressing density and preventing the die from loadings.

Thus the broadest claims that follow are not directed to a machine that is configured in any specific way. Instead, the broadest claims are intended to protect the heart or essence of this breakthrough invention. This invention is clearly new and useful. Moreover, is was not obvious to those of ordinary skill in the art at the time it was made, in view of the prior art when considered as a whole.

Moreover, in view of the revolutionary nature of this invention, it is clearly a pioneering invention. As such, the claims that follow are entitled to very broad interpretation so as to protect the heart of this invention, as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A synthetic wood meal wherein a thermoplastic resin material of 25 to 80 wt % is stirred and mixed using rotating stirring and impact-applying blades with a cellulose crushed material having a mean particle diameter of 20 mesh or less of 20 to 75 wt %, wherein the cellulose crushed material is dried to a moisture content of 0.1 to 0.3 wt % by the frictional heat generated from the rotation and impact of said blades, creating a mixture, said mixture being kneaded and frictionally heated by the rotation and impact of said blades causing the dried cellulose crushed material to be surrounded by the resin forming a gelatinous mixture, and said kneaded mixture being cooled and pulverized, and regulated to have a particle diameter of 10 mm or less.

2. A method of manufacturing for a synthetic wood meal comprising the steps of:

drying a cellulose crushed material, having a mean particle diameter of 20 mesh or less, to a moisture content of 0.1 to 0.3 wt % by frictional heat generated from a rotation of stirring and impact-applying blades, mixing said crushed material;

stirring and mixing a thermoplastic resin material of 25 to 80 wt % into the dried cellulose crushed material by rotating said blades creating a mixture;

kneading the mixture with the rotation and impact of said blades generating frictional heat causing said dried cellulose crushed material to be surrounded by the resin forming a gelatinous mixture; and cooling, pulverizing and regulating the kneaded mixture so that the mixture particles have a diameter of 10 mm or less.

3. An apparatus for manufacturing a synthetic wood meal comprising:

flow-mixing and kneading means having stirring and impact-applying blades for stirring and mixing a thermoplastic resin material of 25 to 80 wt % with a cellulose crushed material having a mean particle diameter of 20 mesh or less of 20 to 75 wt % that lies in a moisture content of within 15 wt % and for drying said cellulose crushed material to a moisture content of 0.1 to 0.3 wt % by frictional heat generated from a rotation of said blades, and for kneading said mixed material by the rotation of said blades generating frictional heat and causing the dried cellulose crushed material to be surrounded by the resin forming a gelatinous mixture;

cooling granulation means having a stirring and crushing blade therein and a cooling jacket for granulating said kneaded mixture by cooling; and size regulation means for regulating said cooled and granulated mixture to a granule diameter of 10 mm or less.

4. A synthetic wood board in which thermoplastic resin material of 25 to 80 wt % is stirred and mixed by rotating stirring and impact-applying blades with a cellulose crushed material having a mean particle diameter of 20 mesh or less of 20 to 75 wt %, said crushed material being dried to a moisture content of 0.1 to 0.3 wt % by frictional heat generated by the rotation of said blades, creating a mixture; said rotation of blades kneading said mixture generating frictional heat and causing the cellulose crushed material to be surrounded by the resin forming a gelatinous mixture; said kneaded mixture being cooled, pulverized and regulated to a particle diameter of 10 mm or less, creating a size regulated synthetic wood material; and said size regulated synthetic wood material being heated, kneaded and squeezed by a screw or screws into a molding die; wherein said material is cooled slowly, while applying a control force against the squeezing force of said material so as to increase the density of said material.

5. A method of extrusion molding for a synthetic wood board comprising the steps of:

drying a cellulose crushed material, having a mean particle diameter of 20 mesh or less of 20 to 75 wt %, to a moisture content of 0.1 to 0.3 wt % by frictional heat generated from a rotation of stirring and impact-applying blades;

stirring and mixing a thermoplastic resin material of 25 to 80% wt into said dried cellulose crushed material by rotating said blades, creating a mixture;

kneading said mixed material by rotation of said blades generating frictional heat and causing the cellulose crushed material to be surrounded by the resin forming a gelatinous mixture;

cooling, pulverizing and regulating said kneaded material to have a particle diameter of 10 mm or less, creating a size regulated synthetic wood meal;

heating, kneading and squeezing said size regulated synthetic wood meal by a screw or screws into a molding die through which it is extruded; and cooling slowly said squeezed material, while applying a control force against a force squeezing said material so as to increase the density of said extruded material.

6. A method of extrusion molding for a synthetic wood board according to claim 5 said molding die including an inner wall layer on the inner wall surface thereof, being formed out of resin having an excellent heat resisting property and low frictional resistance, so as to extrude said extruding material with a predetermined thickness, while cooling slowly in said molding portion.

7. A method of extrusion molding for a synthetic wood board according to claim 5 or 6, wherein said extruding material is heated in a lead-in portion and squeezed into said molding portion of said molding die.

8. A method of extrusion molding for a synthetic wood board according to claim 6, wherein said inner wall layer is formed by lining with a fluororesin sheet on the inner wall surface of said molding die or by directly coating fluororesin thereon.

9. An apparatus of extrusion molding for a synthetic wood board comprising:

flow-mixing and kneading means provided with stirring and impact-applying blades for stirring and mixing a thermoplastic resin material of 25 to 80 wt % with a cellulose crushed material having a mean particle diameter of 20 mesh or less of 20 to 75 wt % that lies in the moisture content of within 15 wt % and for drying said cellulose crushed material to a moisture content of 0.1 to 0.3 wt % by frictional heat generated from a rotation of said blades, and for kneading said mixed material by rotation of said blades generating frictional heat and causing said crushed cellulose material to be surrounded by the resin forming a gelatinous mixture;

cooling granulation means provided with a stirring and crushing blade therein and an inlet and an outlet of cooling water in a jacket for granulating said gelled kneaded material by cooling; and size regulation means for regulating said cooled and granulated wood meal to a size that lies in the granule diameter of 10 mm or less so as to obtain synthetic wood meal;

wherein an extruding die of an extruder for kneading said synthetic wood meal by heating and squeezing said synthetic wood meal by a screw or screws is connected with a molding die including a lead-in portion for heating said kneaded and squeezed material discharged from said extruding die and a molding portion provided with a molding chamber for molding said extruding material squeezed from said lead-in portion with a predetermined thickness;

wherein said molding die includes an inner wall layer on the inner wall surface of said molding portion, being formed out of resin having an excellent heat resisting property and low frictional resistance and a cooling means for cooling said molding chamber; and braking means for applying control force against the squeezing force of the molded article extruded from said molding die.

10. An apparatus of extrusion molding for a synthetic wood board according to claim 9, wherein said inner wall layer is formed by lining with a fluororesin sheet on the inner wall surface of said molding die or by directly coating fluororesin thereon.

11. An apparatus of extrusion molding for a synthetic wood board according to claim 9, further comprising a guide plate provided in said lead-in portion of said molding die for heating said extruding material discharged from said extruding die of said extruder, which has a length of 70 to 95% to the whole length of said lead-in portion in the direction of width and a height of 70% or less to the height of said lead-in portion.

12. An apparatus of extrusion molding for a synthetic wood board according to claim 11, wherein the surface of said guide plate is lined with a fluororesin sheet or coated by fluororesin directly.

13. An apparatus of extrusion molding for a synthetic wood board according to claim 9, wherein said braking means includes a plurality of rollers coupled in up and down direction for holding the front and back surface of said molded article and pressing to contact with each other through said molded article, and rod ends of an air cylinder are rotatably connected with the both shaft ends of the upper rollers so as to adjustably apply the pressing force to the lower rollers through said molded article.

14. An apparatus of extrusion molding for a synthetic wood board according to claim 9, wherein said braking means includes a plurality of rollers coupled in up and down direction for holding the front and back surface of said molded article and pressing to contact with each other through said molded article, and the shaft end of one of said rollers is connected with an input shaft of a powder brake while engaging gears provided at the respective shaft ends of said rollers.

15. A method for manufacturing synthetic wood meal, and a synthetic wood board, a method and an apparatus of extrusion molding for said synthetic wood board according to claim 2, wherein said wood meal of 60 to 75 wt % as said cellulose crushed material is stirred and mixed in one of or a combination of polypropylene or polyethylene of 25 to 40 wt % as said thermoplastic resin material.

16. A method for manufacturing synthetic wood meal, according to claim 2, wherein said wood meal of 60 to 65 wt % as said cellulose crushed material is stirred and mixed in polycarbonate, nylon or PVC 35 to 40 wt % as said thermoplastic resin material.

17. A method of extrusion molding for a synthetic wood board according to claim 5, wherein a urea solution having a concentration of 40% is stirred and mixed in at the rate of 1 wt % to said cellulose crushed material.

18. A method for manufacturing a synthetic wood meal according to claim 2, wherein calcium carbonate or titanium oxide is stirred and mixed in at the rate of 5 to 20 wt % to said cellulose crushed material and said thermoplastic resin material.

19. A method of extrusion molding for a synthetic wood board according to claim 5 wherein said cellulose crushed material is stirred and mixed in at the rate of 30 to 70 wt % to said thermoplastic resin material.

20. An apparatus of extrusion molding for a synthetic wood board according to claim 9, wherein said lead-in portion is formed in said molding die in the direction of width of said molding die and includes a lead-in orifice expansively forming it vertical-cross section into an elliptical shape.

21. An apparatus of extrusion molding for a synthetic wood board according to claim 9, wherein said lead-in portion is curved in the direction of width of said molding die and formed into a shape of coat-hanger type of which the both ends is extended to both ends of an inlet of said molding chamber of the long side direction, and said lead-in portion further includes a lead-in ;chamber forming a triangular cross section in the direction of which the vertical cross section becomes gradually narrow toward said molding chamber between said lead-in orifice and the inlet of said molding chamber.

22. An apparatus of extrusion molding for a synthetic wood board according to claim 9, wherein second molding die is provided to connect with said extruding die of said extruder.

23. An apparatus of extrusion molding for a synthetic wood board according to claim 9, wherein said molding die of said extruder forms an injection port into a square shape having a height equal to or less than that of said molding chamber in said molding portion of said molding die.

24. A method of extrusion molding for a synthetic wood board according to claim 5 or 6, wherein said extruding material is heated in a lead-in portion of said molding die, the lead-in portion having a guide plate for heating said extruded material discharged from said extruding die of said extruder, said guiding plate having a width of 70 to 95% of the width of said lead-in portion and a height of 70% or less of the height of said lead-in portion of said molding die.

* * * * *